US009003150B2

(12) United States Patent
Ohira et al.

(10) Patent No.: US 9,003,150 B2
(45) Date of Patent: Apr. 7, 2015

(54) TIERED STORAGE SYSTEM CONFIGURED TO IMPLEMENT DATA RELOCATION WITHOUT DEGRADING RESPONSE PERFORMANCE AND METHOD

(75) Inventors: Yoshinori Ohira, Yokohama (JP); Hiroaki Akutsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/509,703

(22) PCT Filed: Apr. 26, 2012

(86) PCT No.: PCT/JP2012/002882
§ 371 (c)(1),
(2), (4) Date: Oct. 1, 2013

(87) PCT Pub. No.: WO2013/160958
PCT Pub. Date: Oct. 31, 2013

(65) Prior Publication Data
US 2014/0019701 A1 Jan. 16, 2014

(51) Int. Cl.
*G06F 12/06* (2006.01)
*G06F 12/02* (2006.01)
*G06F 3/06* (2006.01)

(52) U.S. Cl.
CPC ............ *G06F 12/02* (2013.01); *G06F 12/0638* (2013.01); *G06F 12/023* (2013.01); *G06F 3/0613* (2013.01); *G06F 3/0649* (2013.01); *G06F 3/0685* (2013.01)

(58) Field of Classification Search
CPC ... G06F 12/0638; G06F 12/023; G06F 12/08; G06F 3/0611; G06F 3/0613; G06F 3/0647

USPC .......................................... 711/165, E12.019
See application file for complete search history.

(56) References Cited

U.S. PATENT DOCUMENTS

| 8,443,157 B1 * | 5/2013 | Reiner .......................... 711/154 |
| 2006/0004957 A1 * | 1/2006 | Hand et al. ..................... 711/113 |
| 2006/0129771 A1 | 6/2006 | Dasgupta et al. |
| 2011/0167236 A1 | 7/2011 | Orikasa et al. |
| 2011/0191556 A1 * | 8/2011 | Anderson et al. ............. 711/162 |
| 2011/0202732 A1 | 8/2011 | Montgomery |
| 2011/0246739 A1 | 10/2011 | Matsuda et al. |
| 2011/0289296 A1 | 11/2011 | Saito et al. |
| 2012/0036327 A1 * | 2/2012 | Jennas et al. ................... 711/137 |
| 2012/0102350 A1 * | 4/2012 | Belluomini et al. .......... 713/324 |
| 2012/0278511 A1 * | 11/2012 | Alatorre et al. ................. 710/33 |
| 2013/0124780 A1 * | 5/2013 | Baderdinni et al. .......... 711/103 |

* cited by examiner

*Primary Examiner* — Hal Schnee
(74) *Attorney, Agent, or Firm* — Volpe and Koenig, P.C.

(57) ABSTRACT

An example of an information storage system includes physical storage drives for providing real storage areas to a pool which is tiered into tiers different in performance, and a controller. The controller monitors accesses in a first tier in the pool. The controller determines a loaded state of the first tier based on the accesses to the first tier. The controller holds management information relating loads to the first tier to relocation speeds and/or modes of moving data in data relocation between a second tier in the pool and the first tier. The controller determines at least one of a relocation speed and a mode of moving data in data relocation between the second tier and the first tier based on the determined loaded state of the first tier and the management information.

15 Claims, 33 Drawing Sheets

Fig. 5

VIRTUAL-TO-LOGICAL CONVERSION TABLE 301

| PAGE # 501 | VIRTUAL VOLUME # 502 | VIRTUAL ADDRESS 503 | POOL # 504 | PARITY GROUP # 505 | LOGICAL ADDRESS 506 |
|---|---|---|---|---|---|
| 1 | 1 | 0x0000 | 1 | 3 | 0x0040 |
| 2 | 1 | 0x0010 | 1 | 1 | 0x0050 |
| 3 | 2 | 0x0000 | 1 | 3 | 0x0020 |
| 4 | 2 | 0x0010 | 1 | 2 | 0x0040 |
| 5 | 2 | 0x0020 | 1 | 1 | 0x0010 |
| ... | ... | ... | ... | ... | ... |

Fig. 6

LOGICAL-TO-PHYSICAL CONVERSION TABLE (302)

| PARITY GROUP # (601) | RAID TYPE (602) | PHYSICAL DRIVE # (603) |
|---|---|---|
| 1 | RAID5 (3D+1P) | 1000 |
| | | 1001 |
| | | 1002 |
| | | 1003 |
| 2 | RAID1 | 1004 |
| | | 1005 |

Fig. 7

GRANULAR MONITORING TABLE (303)

| PAGE # (701) | VIRTUAL VOLUME # (702) | VIRTUAL ADDRESS (703) | I/O COUNT (704) |
|---|---|---|---|
| 1 | 1 | 0x0000 | 1000 |
| 2 | 1 | 0x0010 | 200 |
| 3 | 2 | 0x0000 | 0 |
| 4 | 2 | 0x0010 | 0 |
| 5 | 2 | 0x0020 | 50 |
| ... | ... | ... | ... |

PARITY GROUP MONITORING TABLE

| 801 PARITY GROUP # | 802 TIER | 803 I/O COUNT | 804 RELOCATION COUNT (SOURCE) | 805 RELOCATION COUNT (DESTINATION) |
|---|---|---|---|---|
| 1 | Tier1 | 100 | 30 | 40 |
| 2 | Tier2 | 30 | 5 | 10 |
| 3 | Tier2 | 70 | 15 | 10 |
| 4 | Tier | 1000 | 50 | 50 |
| 5 | Tier2 | 500 | 40 | 30 |

RELOCATION JOB EXECUTION MANAGEMENT TABLE

| 901 TIER | 902 NUMBER OF EXECUTED JOBS | 903 RELOCATION SPEED # | 904 RELOCATION METHOD |
|---|---|---|---|
| 1-2 | 2 | 1 | MIGRATION |
| 2-3 | 2 | 3 | COPY |
| 1-3 | 2 | 5 | SWAP |

| RELOCATION SPEED MANAGEMENT TABLE | | | |
|---|---|---|---|
| 1001 | 1002 | 1003 | 1004 |
| RELOCATION SPEED # | MAXIMUM NUMBER OF JOBS | SLEEP TIME | JOB PRIORITY LEVEL |
| 1 | 3 | 0 | 1 |
| 2 | 2 | 0 | 2 |
| 3 | 1 | 100 | 2 |
| 4 | 1 | 500 | 3 |
| 5 | 1 | 1000 | 3 |

Fig. 11

RELOCATION SPEED DETERMINATION TABLE (307)

| LOAD TO HIGH-CLASS TIER (1101) | LOAD TO LOW-CLASS TIER (1102) | PAGE I/O COUNT (1103) | RELOCATION SPEED # (1104) |
|---|---|---|---|
| HIGH-LOADED | HIGH-LOADED | GREATER | 5 |
| | | SMALLER | 4 |
| | LOW-LOADED | GREATER | 3 |
| | | SMALLER | 5 |
| LOW-LOADED | HIGH-LOADED | GREATER | 1 |
| | | SMALLER | 4 |
| | LOW-LOADED | GREATER | 2 |
| | | SMALLER | 5 |

Fig. 26

COPY SEGMENT MANAGEMENT TABLE 310

| PAGE # 3301 | VIRTUAL VOLUME # 3302 | VIRTUAL ADDRESS 3303 | PRESENCE OF COPY 3304 | STATE OF SEGMENT 3305 | PARITY GROUP # 3306 | LOGICAL ADDRESS 3307 |
|---|---|---|---|---|---|---|
| 1 | 1 | 0x0000 | YES | CLEAN | 3 | 0x0040 |
| 2 | 1 | 0x0010 | NO | — | — | — |
| 3 | 2 | 0x0000 | YES | DIRTY | 3 | 0x0020 |
| 4 | 2 | 0x0010 | YES | CLEAN | 2 | 0x0040 |
| 5 | 2 | 0x0020 | NO | — | — | — |
| ... | ... | ... | ... | ... | ... | ... |

Fig. 33

RELOCATION SPEED MANAGEMENT TABLE   306

| RELOCATION SPEED # | PROMOTION THRESHOLD | MAXIMUM NUMBER OF JOBS IN DEMOTION | SLEEP TIME IN DEMOTION |
|---|---|---|---|
| 1 | 2 | 3 | 0 |
| 2 | 2 | 2 | 0 |
| 3 | 3 | 1 | 100 |
| 4 | 4 | 1 | 500 |
| 5 | 2 | 1 | 1000 |

3301  3302  3303  3304

TIERED STORAGE SYSTEM CONFIGURED TO IMPLEMENT DATA RELOCATION WITHOUT DEGRADING RESPONSE PERFORMANCE AND METHOD

TECHNICAL FIELD

This invention relates to an information storage system and a method of controlling the information storage system, and particularly relates to data relocation between tiers in the information storage system.

BACKGROUND ART

For a storage system to provide a host with volumes, there is a known practice that forms a hierarchically tiered pool from storage areas of multiple drives different in performance capability in the storage system and provisions the host with virtual volumes configured in the pool (for example, refer to PTL1, US 2011/0167236 A).

The storage system analyzes input/output (I/O) loads to the virtual volumes from the host and automatically relocates pages with high I/O load to a high-class tier composed of resources of expensive disks having high performance capability and pages with low I/O load to a low-class tier composed of resources of inexpensive disks having low performance capability (page relocation between tiers). This technique effectively satisfies performance request at lower total cost of ownership (TCO). US 2011/0167236 A also discloses a technique to control the number of pages allocated from SSDs so that the SSDs will not be a bottle neck.

CITATION LIST

Patent Literature

PTL 1: US 2011/0167236 A

SUMMARY OF INVENTION

Technical Problem

To maximize host I/O performance (response performance), an important thing is faster page relocation to minimize the time to complete the page relocation. However, increasing the speed in page relocation causes increase in load in the storage system during the page relocation; consequently, hardware resources such as the CPU in the storage controller and storage drives might become a bottle neck to cause significant degradation in the host I/O performance of the storage system. Accordingly, desired is a technique to perform page relocation faster with minimum degradation in the host I/O performance.

Solution to Problem

An aspect of this invention is an information storage system including a plurality of physical storage drives for providing real storage areas to a pool which is tiered into a plurality of tiers different in performance, and a controller. The controller monitors accesses in a first tier in the pool. The controller determines a loaded state of the first tier based on the accesses to the first tier. The controller holds management information relating loads to the first tier to relocation speeds and/or modes of moving data in data relocation between a second tier in the pool and the first tier. The controller determines at least one of a relocation speed and a mode of moving data in data relocation between the second tier and the first tier based on the determined loaded state of the first tier and the management information.

Advantageous Effects of Invention

An aspect of this invention achieves faster data relocation in a tiered pool while minimizing degradation in host I/O performance.

BRIEF DESCRIPTION OF DRAWINGS

FIG. 5 illustrates an exemplary configuration of a virtual-to-logical conversion table in the embodiment.

FIG. 6 illustrates an exemplary configuration of a logical-to-physical conversion table in the embodiment.

FIG. 7 illustrates an exemplary configuration of a granular monitoring table in the embodiment.

FIG. 8 illustrates an exemplary configuration of a parity group monitoring table in the embodiment.

FIG. 9 illustrates an exemplary configuration of a relocation job execution management table in the embodiment.

FIG. 10A illustrates an exemplary configuration of a relocation speed management table in the embodiment.

FIG. 11 illustrates an exemplary configuration of a relocation speed determination table in the embodiment.

FIG. 26 illustrates an exemplary configuration of a copy segment management table to manage copy segments in the embodiment

FIG. 33 shows another exemplary configuration of the relocation speed management table in the embodiment.

DESCRIPTION OF EMBODIMENTS

Hereinafter, an embodiment of this invention will be described with reference to the accompanying drawings. It should be noted that the embodiment is merely an example to realize this invention and is not to limit the technical scope of this invention. Throughout the drawings, elements common to drawings are denoted by the same reference signs.

In this embodiment, a storage system has a hierarchically tiered pool and relocates data between tiers. This embodiment determines a relocation speed and/or a relocation mode in data relocation between tiers based on inputs/outputs (I/Os) in the storage system and performs data relocation between tiers at the determined relocation speed and/or in the determined relocation mode.

Depending on the relocation speed, the time taken to complete relocation of a plurality of pages changes. As the relocation speed is higher, the time to complete relocation of a plurality of pages is shorter. The relocation mode defines a method of moving data in relocation. A relocation mode defines moving data of a page selected as an object to be relocated or moving data of the page together with other data. Selection of an appropriate relocation speed and/or an appropriate relocation mode leads to improvement in host I/O performance after the relocation while minimizing degradation in the host I/O performance caused by the data relocation.

The following explanations on processing in the embodiment of this invention will be provided with subjects (agents) of program; however, they may have the subjects of processor because a processor executes a program using memories and communication ports (communication control apparatuses) to perform predetermined processing.

The processing disclosed with subjects of program may be regarded as processing performed by a computer or an information processing apparatus, such as a management server or a storage system. A program, for all or a part of it, may be implemented by dedicated hardware or may be separated into modules. The program can be installed in the computer or information processing apparatus through a program distribution server or a non-transitory storage medium.

A processor operates in accordance with a program to work as an operation unit for implementing a predetermined function. For example, the processor operates in accordance with a control program to function as a control unit and operates in accordance with a management program to function as a management unit. An apparatus or a system including the processor is an apparatus or a system including these operation units.

Figure 1:
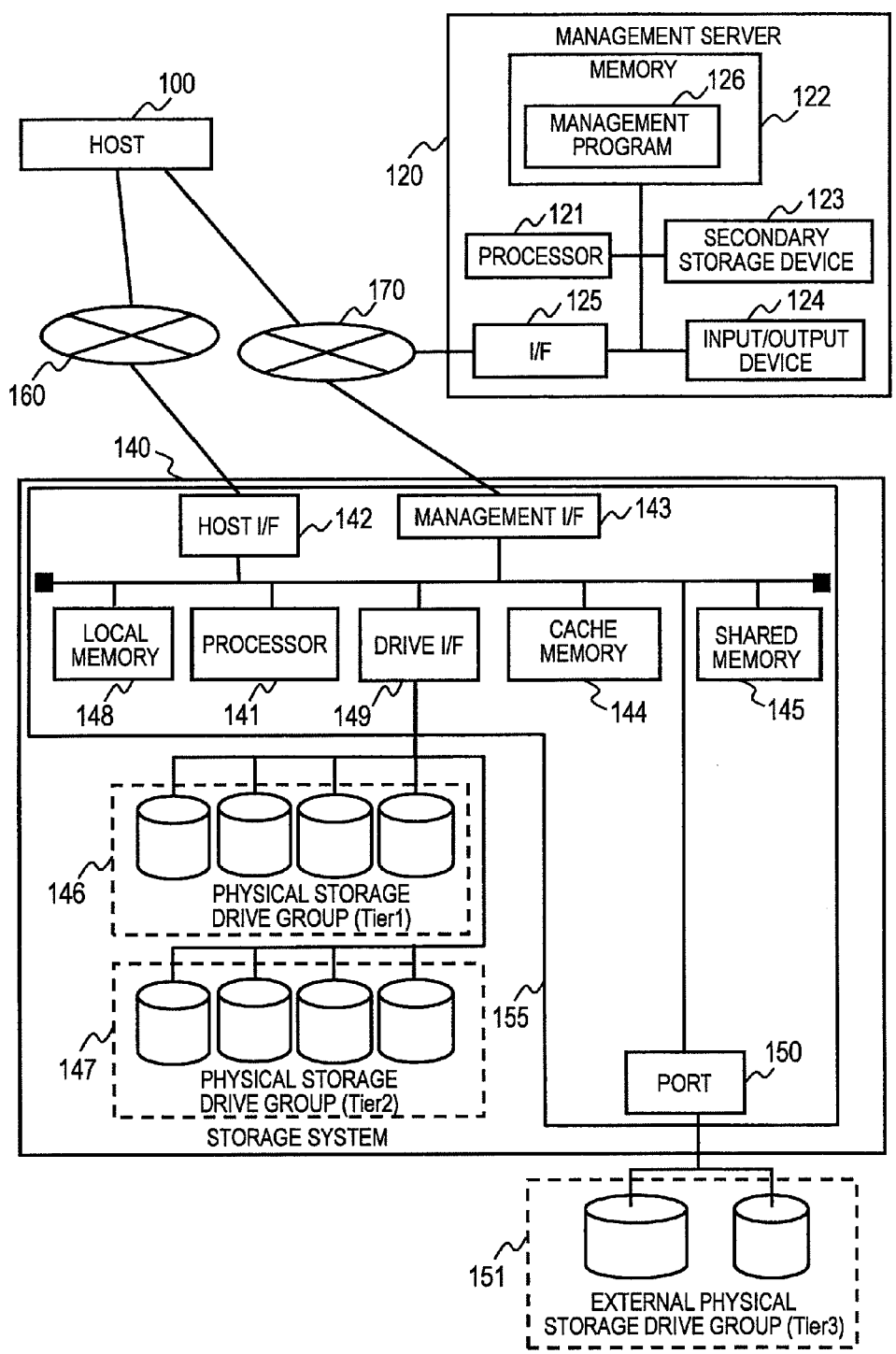
FIG. 1 is a block diagram schematically illustrating an overall configuration of a computer system in an embodiment.

FIG. 1 is a block diagram schematically illustrating an overall configuration of a computer system in this embodiment. This computer system includes a host (host computer) 100, a management server (management computer) 120, and a storage system 140. The computer system can include any number of one or more hosts 100, management servers 120, and storage systems 140.

The host 100, the management server 120, and the storage system 140 are connected to be able to communicate with one another with a management network 170. For example, the management network 170 is an IP network. The management network 170 may be a network other than the IP network as far as it is a network for management data communication.

The host 100 is connected to the storage system 140 with a data network 160. The host 100 is a computer that accesses the resources of the storage system 140 to work. The data network 160 is a network for data communication, for example, a storage area network (SAN). The data network 160 may be a network other than the SAN as far as it is a network for data communication. The data network 160 and the management network 170 may be the same network.

The management server 120 includes a network interface (I/F) 125, a processor 121, a memory 122 of a primary storage device, a secondary storage device 123, and an input/output device 124. The management server 120 executes a management program 126 and works in accordance with it. The devices in the management server 120 are connected to be able to communicate with one another with a bus.

The input/output device 124 includes one or more devices such as a display, a pointer, and a keyboard. The administrator can operate the management server 120 with the input/output device 124; alternatively, the administrator may access the management server 120 from a client computer connected via the network. The client computer is included in the management system together with the management server 120.

The administrator inputs necessary information with an input device (such as a mouse and a keyboard) and checks necessary information by sight with an output device. The management system may consist of one or more computers or may include a plurality of computers each having part or all of the functions of the management server 120.

The processor 121 executes programs retained in the memory 122 to implement predetermined functions of the management server 120. The memory 122 stores programs to be executed by the processor 121 and data required to execute the programs. The programs include a not-shown OS and a management program 126.

In typical, a program is loaded from the secondary storage device 123 to the memory 122. The secondary storage device 123 is a storage device including a non-volatile non-transitory storage medium for storing programs and data required to implement predetermined functions of the management server 120. The secondary storage device 123 may be an external storage apparatus connected via a network.

The storage system 140 includes different kinds of physical storage drive groups 146 and 147 and a storage controller 155 for controlling data transfer among the host 100 and physical storage drive groups 146 and 147.

The storage controller 155 includes a processor 141, a local memory 148, a shared memory 145, a cache memory 144, a host interface 142, a management interface 143, a drive interface 149, and a port 150. The storage system 140 is connected to an external physical storage drive group 151 via the port 150. The storage system 140 may include a storage controller for providing multiple clusters.

The processor 141 executes storage control programs (refer to FIG. 4) to implement predetermined functions including control of I/Os with the host 100 and management and control of pools and volumes in the storage system 140. At least part of the functions of the storage controller 155 explained in this embodiment may be implemented by a logic circuit other than the processor 141.

The local memory 148 stores data and programs to be handled by the processor 141. Data retained in the local memory 148 is not shared with other storage systems. In typical, storage control programs or data to be used to control the storage system 140 are loaded from any of the storage drives or flash memories (not shown).

The management interface 143 is a device for connecting to the management server 120. The management interface 143 has a function to convert a protocol used for communication between the management server 120 and the storage controller 155, such as IP protocol, into a protocol used inside the storage controller 155, such as PCIe.

The host interface 142 is a device for connecting to the host 100. The host interface 142 has a function to convert a protocol used for communication between the host 100 and the storage controller 155, such as FC, Fibre Channel over Ethernet (FCoE), or iSCSI, into a protocol used inside the storage controller 155, such as PCIe.

The drive interface 149 is a device for connecting to the physical storage drive groups 146 and 147. The drive interface 149 has a function to convert a protocol used for communication between the physical storage drive groups 146 and 147 and the storage controller 155, such as FC, Serial Attached SCSI (SAS), or Serial Advance Technology Attachment (SATA), into a protocol used inside the storage controller 155, such as PCIe.

The cache memory 144 temporarily stores data (user data) read/written by the host 100 from/to the physical storage drive groups 146, 147, or 151 (caching user data) and relays the data among them. The shared memory 145 is used by the processor 141 (storage control programs) to store data shared with other storage systems. The shared memory 145 does not need to be provided. Data retained in the shared memory 145 in this system will be described later with reference to FIG. 3.

In this exemplary configuration, the storage system 140 includes three tiers of physical storage drives having different access capabilities. The access capability is represented by indices of response time and throughput. The physical storage drive group 146 is a tier of physical storage drives having the highest access capability (Tier1) and the physical storage drive group 147 is a tier of physical storage drives having the next highest access capability (Tier2). The storage system 140 further includes an external physical storage drive group 151 of a tier of physical storage drives having the lowest access capability (Tier3).

For example, the physical storage drive group 146 (Tier1) consists of solid state drives (SSDs) and the physical storage drive group 147 (Tier2) consists of hard disk drives (HDDs). The physical storage drives in one tier have a lower access capability than those in a higher-class tier and have a higher access capability than those in a lower-class tier. In typical, physical storage drives in the same tier have the same access capability, but may have different access capabilities as far as the differences are small.

The access capabilities of physical storage drives may be different depending on the interface of the physical storage drive. For example, Serial Attached SCSI (SAS) HDDs can constitute a tier different from a tier of Serial ATA (SATA) HDDs.

Figure 2:
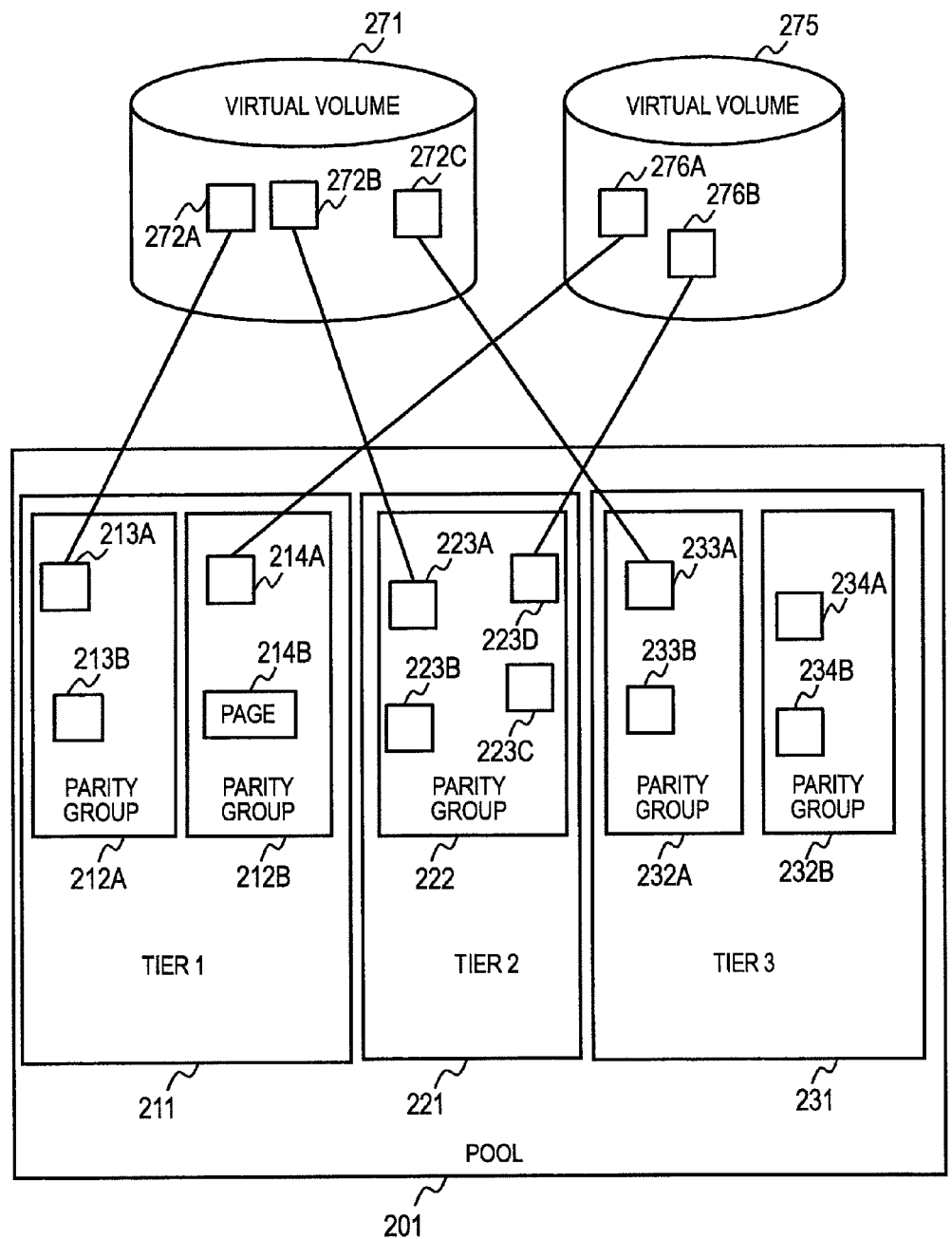
FIG. 2 schematically illustrates a logical configuration of virtual volumes a storage system providing to a host and a pool provisioning the virtual volumes in the embodiment.

FIG. 2 schematically illustrates a logical configuration of virtual volumes the storage system 140 provides to the host 100 and a pool provisioning the virtual volumes. The storage system 140 can configure one or more pools. The following description basically explains one pool. If the storage system 140 includes a plurality of pools, the storage system 140 can perform the operations described hereinafter for each pool.

FIG. 2 illustrates an example providing the host 100 with storage areas 211, 221, and 231 in three tiers (Tier1, Tier2, and Tier3). The pool may be tiered into more than three or less than three tiers. For example, the highest-class tier (Tier1) is composed of storage areas of SSDs, the next-class tier (Tier2) is composed of storage areas of SAS HDDs, and the lowest-class tier (Tier3) is composed of storage areas of SATA HDDs.

In FIG. 2, the storage controller 155 configures virtual volumes 271 and 275 from storage areas in the pool 201. The pool 201 is managed in units of pages (storage areas having a predetermined capacity). Every time the host 100 writes to the virtual volume 271 or 275 to cause a need of data storage area, the storage system 140 allocates a page to the virtual volume 271 or 275. It also releases unnecessary pages.

Such dynamic allocation of pages allows virtualization of the capacities of the virtual volumes 271 and 275. In other words, the actual capacities can be made smaller than the capacities recognized by the host 100 (allocated to the host 100). The storage system 140 may provide the host 100 with volumes composed of pages in the pool and having actual capacities same as those recognized by the host 100.

As described above, the pool 201 is hierarchically tiered. In this example, the pool 201 consists of three tiers: Tier1 (211), Tier2 (221), and Tier3 (231). Each tier is allocated storage areas of one or more parity groups (RAID groups). Storage areas of all or part of the parity groups are allocated to a tier. The storage controller 155 can allocate pages in different tiers to the virtual volume 271 or 275.

In the example of FIG. 2, Tier1 (211) is allocated storage areas 212A and 212B of two parity groups; Tier2 (221) is allocated a storage area 222 of one parity group; and Tier3 (231) is allocated storage areas 232A and 232B of two parity groups.

The parity group storage area 212A in Tier1 includes pages 213A and 213B; the page (real page) 213A is allocated to a page (virtual page) 272A in the virtual volume 271. The parity group storage area 212B in Tier1 includes pages 214A and 214B; the page (real page) 214A is allocated to a page (virtual page) 276A in the virtual volume 275.

The parity group storage area 222 in Tier2 includes pages 223A to 223D. The page (real page) 223A is allocated to a page (virtual page) 272B in the virtual volume 271. The page (real page) 223D is allocated to a page (virtual page) 276B in the virtual volume 275.

The parity group storage area 232A in Tier3 includes pages 233A and 233B; the page (real page) 233A is allocated to a page (virtual page) 272C in the virtual volume 271. The parity group storage area 232B in Tier3 includes pages 234A and 234B; neither page is allocated to the virtual volume 271 or 275.

In the example explained hereinafter, it is assumed that the pool 201 is tiered into three tiers: Tier1, Tier2, and Tier3. Tier1 is the highest-class tier and is composed of storage areas of physical storage drives having the highest performance capability (for example, SSDs). Tier2 is the next-class tier and is composed of storage areas of physical storage drives having the second performance capability (for example, SAS HDDs). Tier3 is the lowest-class tier and is composed of storage areas of physical storage drives having the lowest performance capability (for example, SATA HDDs).

Figure 3:
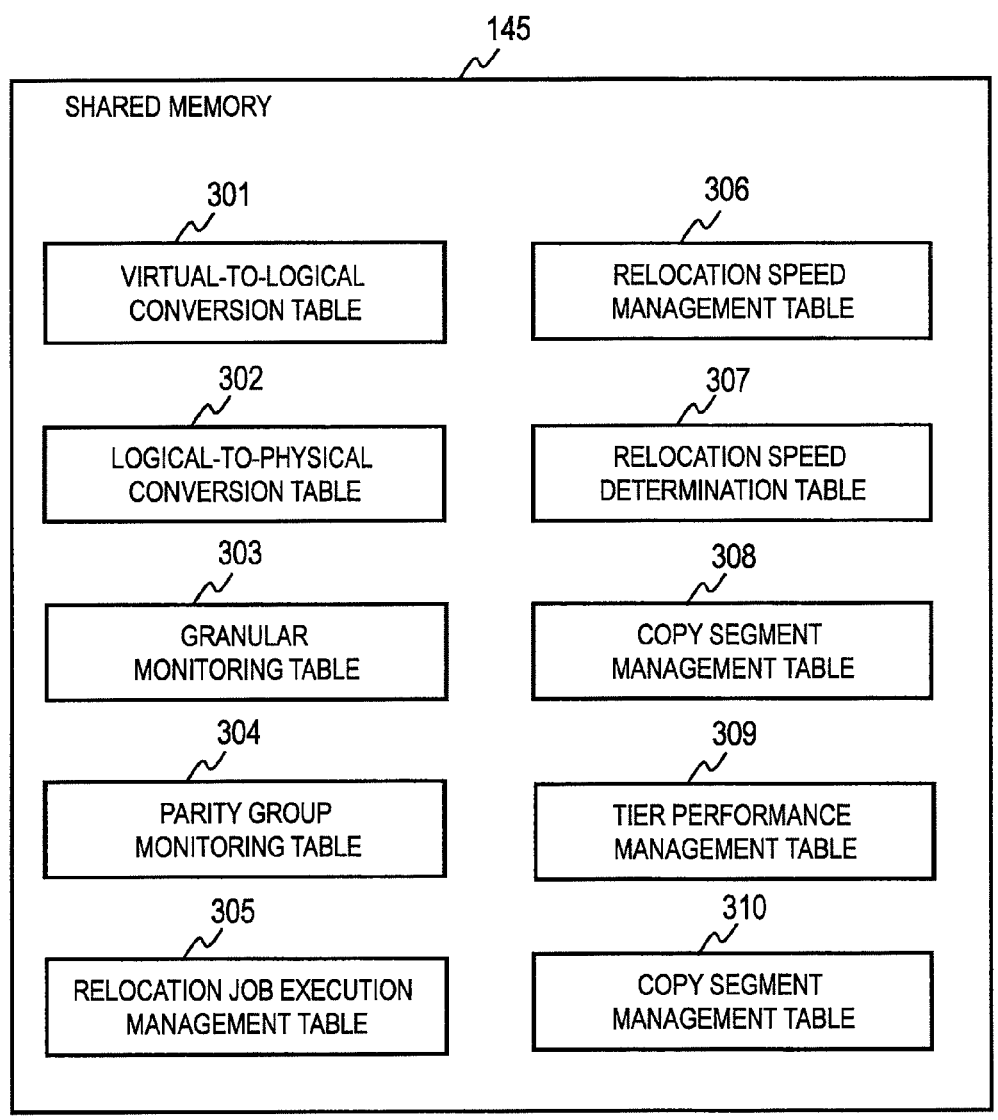
FIG. 3 is a block diagram illustrating data retained in a shared memory in the embodiment.

FIG. 3 is a block diagram illustrating data retained in the shared memory 145. The shared memory 145 retains a virtual-to-logical conversion table 301, a logical-to-physical conversion table 302, a granular monitoring table 303, a parity group monitoring table 304, a relocation job execution management table 305, a relocation speed management table 306, a relocation speed determination table 307, a copy segment management table 308, and a tier performance management table 309.

Storage control programs control and manage operations of the storage system 140 with reference to these tables. Details of each table will be described later. These tables may be held in the local memory 148. It should be noted that information is explained with terms of table, list, DB, and queue in this embodiment; however, information utilized in this invention does not depend on the data structure but can be expressed in an appropriate data structure in accordance with the design. Furthermore, terms such as identifier, name, and ID are used to explain the details of information; however, these terms may be replaced with one another.

Figure 4:
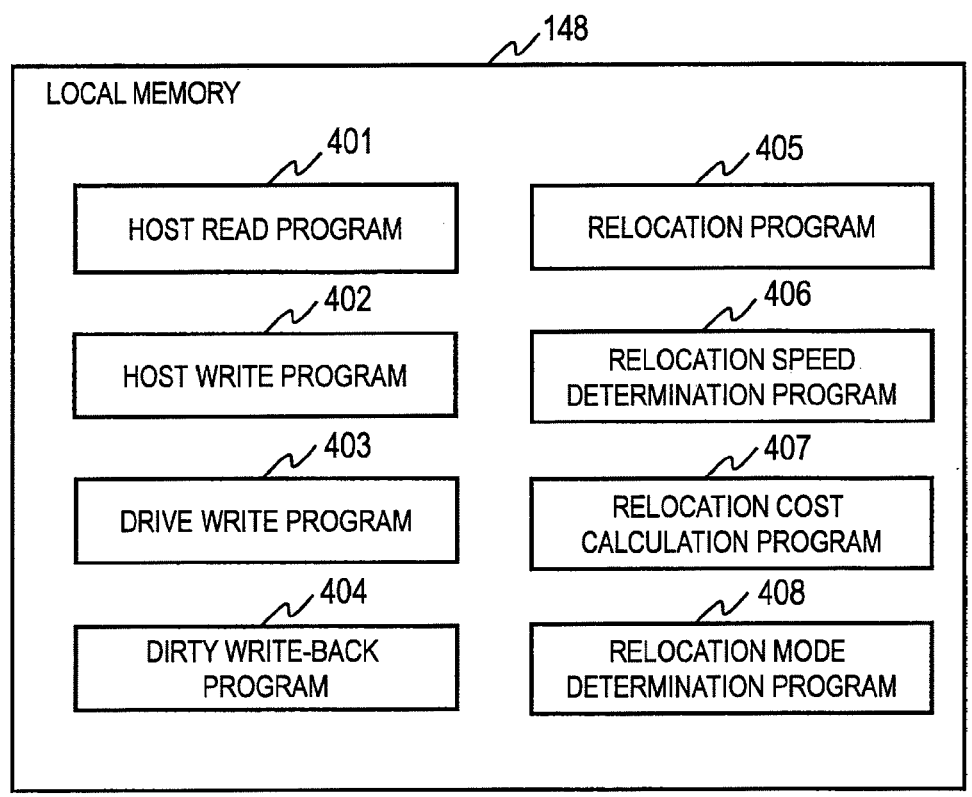
FIG. 4 is a block diagram illustrating exemplary storage control programs retained in a local memory in the embodiment.

FIG. 4 is a block diagram illustrating exemplary storage control programs retained in the local memory 148. The storage control programs include a host read program 401, a host write program 402, a drive write program 403, a dirty writeback program 404, a relocation program 405, a relocation speed determination program 406, a relocation cost calculation program 407, and a relocation mode determination program 408. Details of each program will be described later.

FIG. 5 illustrates an exemplary configuration of the virtual-to-logical conversion table 301. The virtual-to-logical conversion table 301 is a table to be referred to in order to convert an address (virtual address) of a virtual volume specified by the host 100 to a logical address in a parity group (pool 201) managed by the storage controller 155. Logical addresses are unique in a parity group.

An entry of the virtual-to-logical conversion table 301 stores address information on one page. The virtual-to-logical conversion table 301 includes columns of page numbers 501, virtual volume numbers 502, virtual addresses 503, pool numbers 504, parity group numbers 505, and logical addresses 506. A virtual address indicates the location of data in a virtual volume and a logical address indicates the location of data in a parity group in a pool.

The page number column 501 stores values for identifying pages. For example, the page numbers are unique in the pool 201. The virtual volume number column 502 stores values for identifying virtual volumes allocated individual pages. For example, the virtual volume numbers are unique in the pool 201. The virtual address column 503 stores start addresses of the virtual addresses assigned to individual pages in virtual volumes. It is assumed that each page has a specified uniform value of capacity.

The pool number column 504 stores values for identifying pools including the pages. The parity group number column 505 stores values for identifying parity groups including the pages. For example, parity group numbers are unique in the pool 201. The logical address column 506 stores start addresses of logical addresses of individual pages in parity groups.

The storage controller 155 can determine a logical address in a parity group in a pool from a virtual address in a virtual volume specified by a read command or write command from the host 100 with reference to the virtual-to-logical conversion table 301.

FIG. 6 is a drawing illustrating an exemplary configuration of the logical-to-physical conversion table 302. The logical-to-physical conversion table 302 is a table referred to in order to convert a logical address in the pool 201 into a physical address in a physical storage drive. The logical-to-physical conversion table 302 includes columns of parity group numbers 601, RAID types 602, and physical storage drive numbers 603.

The RAID type column 602 stores identifiers of RAID types (RAID levels) of parity groups; the physical storage drive number column 603 stores physical storage drive numbers of all physical storage drives that constitute individual parity groups.

Defining the RAID type of a parity group and the physical storage drives that constitute the parity group leads to defining a logical address space of the parity group in consideration of the arrangement of parity data. Based on the defined logical address space, the controller 155 can locate the physical storage drive number and the physical address in the drive from a logical address in a parity group.

FIG. 7 illustrates an exemplary configuration of the granular monitoring table 303. The granular monitoring table 303 manages the number of I/Os issued to individual pages (virtual pages) within a predetermined monitoring period (including both of I/Os of the host and I/Os caused by relocation). A virtual page has been allocated a real page (real storage area) or, as described later, a real page and a copy segment (real storage area); the number of I/Os of a virtual page to be counted is the number of I/Os of a real page and a copy segment.

In this example, the storage controller 155 monitors read accesses and write accesses for I/Os. In other words, the number of I/Os is the sum of the number of read accesses and the number of write accesses. In another example, the storage controller 155 may monitor either one of them, for example, only read accesses.

The storage controller 155 monitors operations in the storage system 140 in a specified length of monitoring period to manage the result of monitoring. Particularly in this embodiment, the storage controller 155 monitors the number of I/Os of the host and the number of page relocations (I/Os caused by relocation). The storage controller 155 counts these values in a predetermined length of monitoring period and stores the latest count value at the end of the monitoring period to one or more of the management tables shown in FIG. 3.

The monitoring period is repeated in predetermined cycles. In typical, the monitoring period is common in counting any numerical values, but may be different depending on the value. Since the length of the monitoring period is predetermined, host I/O frequency (IOPS) can be calculated from the number of host I/Os in the certain period and I/O frequency (IOPS) caused by page relocation can be calculated from the number of page relocations.

The granular monitoring table 303 includes columns of page numbers 701, virtual volume numbers 702, virtual addresses 703, and I/O counts 704. Information stored in the columns of page numbers 701, virtual volume numbers 702, and virtual addresses 703 is as described with reference to foregoing drawings.

The I/O count column 704 stores values of I/O counts of individual pages in the latest monitoring period which has ended. An I/O count is a sum of the number of I/Os caused by commands from the host and the number of I/Os caused by relocation. The I/O count caused by relocation includes both of the number of accesses caused by read from physical disks of relocation sources and the number of accesses caused by write to physical disks of relocation destinations. As described above, the storage controller 155 counts I/Os of individual pages in a specified length of monitoring period. The values of I/Os being counted are held in a different table (not shown).

The storage controller 155 updates the values in the I/O count column 704 with the values of the results of monitoring after the end of the monitoring period. For example, the storage controller 155 working in accordance with a management table update program updates values to be updated in the granular monitoring table 303 and other tables after the end of a monitoring period. The value obtained by dividing a value in the I/O count column 704 by the length of the monitoring period is IOPS of the page.

FIG. 8 illustrates an exemplary configuration of the parity group monitoring table 304. The parity group monitoring table 304 manages the number of I/Os of each parity group being monitored (the sum of the number of I/Os of the host and the number of I/Os caused by relocation) and the number of page relocations among parity groups being monitored. The parity group monitoring table 304 includes columns of parity group numbers 801, tiers 802, I/O counts 803, relocation counts (source) 804, and relocation counts (destination) 805.

Information stored in the parity group number column 801 is as described above with reference to a foregoing drawing. The tier column 802 stores values for identifying the tiers (storage areas provided by) individual parity groups belong to.

The I/O count column 803 stores the sums of the number of I/Os issued by the host to individual parity groups and the number of I/Os issued because of relocation in a specified length of monitoring period. A relocation corresponds to issuance of a read command from a relocation source and issuance of a write command to a relocation destination. In this example, the method of counting I/Os is the same as the foregoing method of counting I/Os of pages and the monitoring period is common to these methods. In this example, the sum of the number of I/Os of all pages included in a parity group is the number of I/Os for the parity group.

The relocation count (source) column 804 stores the number of relocations from the present parity group to another. The relocation count (destination) column 805 stores the number of relocations from a different parity group to the present parity group.

The method of counting these relocations counts the number of relocations in the monitoring period common to the monitoring period for counting I/Os issued from the host to parity groups, and updates the values in the relocation count (source) column 804 and the relocation count (destination) column 805 after the end of the monitoring period. The values of the I/O counts and relocation counts being counted are held in a different table (not shown).

FIG. 9 illustrates an exemplary configuration of the relocation job execution management table 305. The relocation job execution management table 305 manages relocation jobs between tiers. The relocation job execution management table 305 is provided for each pool. In this example, the relocation job execution management table 305 includes columns of tiers 901, the number of executed jobs 902, relocation speed numbers 903, and relocation modes 904.

The tier column 901 stores identification information on two tiers involving page relocation. Since the pool in this example is tiered into three, entries of relocations between Tier1 and Tier2, between Tier2 and Tier3, and between Tier1 and Tier3 are held.

The column of the number of executed jobs 902 stores the number of jobs in relocation between tiers actually being executed. The relocation speed number column 902 stores values to identify relocation speeds determined for relocation between tiers. The relocation speed will be described later with reference to FIG. 10A.

The relocation mode column 904 stores identifiers of relocation modes (modes of moving data) determined for relocation between tiers. Although the relocation mode will be described later, this example provides three modes of migration, copy, and swap; one of them is selected for assignment. The storage controller 155 performs page relocation in accordance with the determined relocation speed and relocation mode, with reference to the relocation job execution management table 305.

FIG. 10A illustrates an exemplary configuration of the relocation speed management table 306. The relocation speed management table 306 defines relocation speeds applicable to page relocation. In this example, parameters to define a relocation speed are the number of jobs, a sleep time, and a job priority level. The relocation speed management table 306 includes columns of relocation speed numbers 1001, maximum number of jobs 1002, sleep times 1003, and job priority levels 1004.

The information stored in the relocation speed number column 1001 is as explained with reference to a foregoing drawing. The column of the maximum number of jobs 1002 stores values of the maximum number of jobs available for multiple executions (the maximum number of jobs available for concurrent execution) defined for individual relocation speed numbers. As the number of jobs increases, the relocation speed increases.

The sleep time column 1003 stores values indicating sleep times in relocation. A sleep time is a stand-by period after the end of relocation of one page until the start of relocation of the next page. In the case of multiple relocation jobs, each job should wait for relocation of the next page for a specified sleep time after relocation of one page. A shorter sleep time results in a faster relocation speed.

The job priority level column 1004 stores priority levels of relocation jobs compared with other jobs (for example, host I/O jobs). In the job priority level column 1004 in this example, a smaller value of the priority level means a higher priority level. The storage controller 155 executes a job with the highest priority first. The relocation speed for a relocation job with a high priority level does not decrease (the relocation is executed at a higher speed) even if the storage system 140 is highly loaded. In the case of multiple relocation jobs, all of the jobs are typically assigned the same priority level.

Figure 10B:
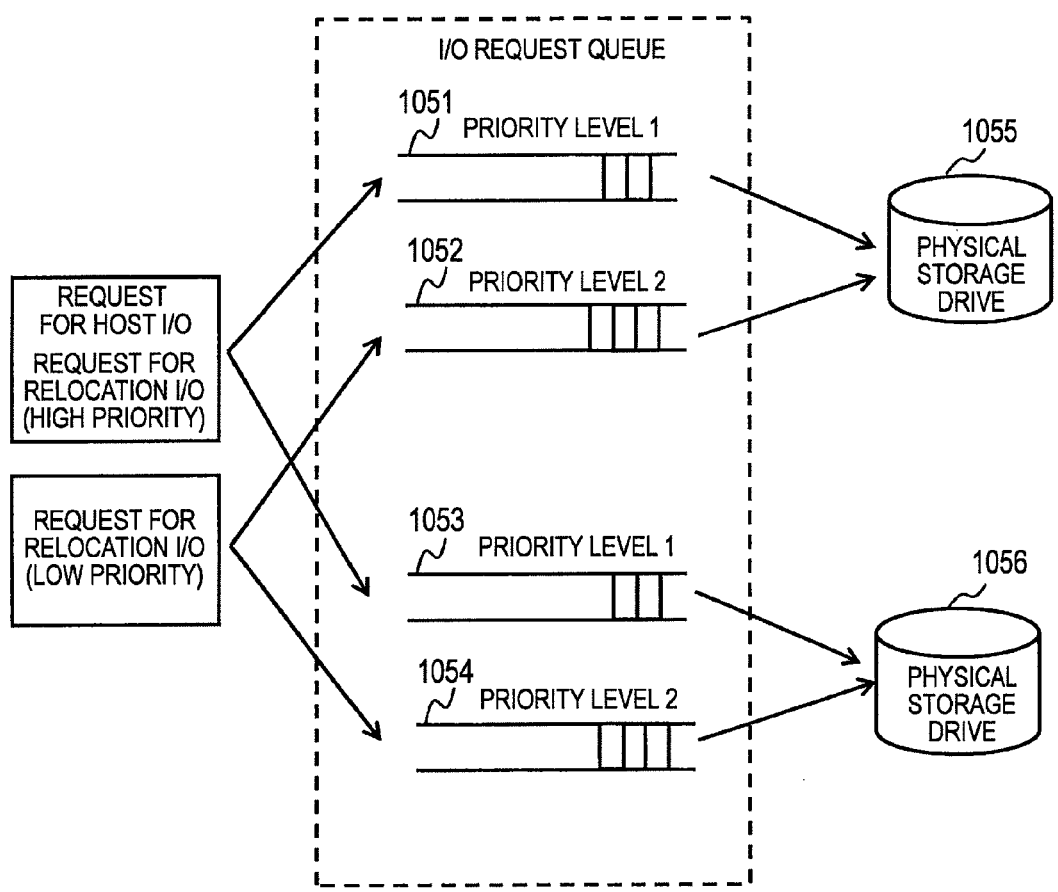
FIG. 10B schematically illustrates an overview of operations in accordance with the job priority level in the embodiment.

FIG. 10B schematically illustrates an overview of operations in accordance with the job priority level. The storage controller 155 holds I/O request queues at individual priority levels for each physical storage drive. In this example, the storage controller 155 has a high-priority queue 1051 (priority level 1) and a low-priority queue 1052 (priority level 2) for a physical storage drive 1055. The storage controller 155 also has a high-priority queue 1053 (priority level 1) and a low-priority queue 1054 (priority level 2) for a physical storage drive 1056.

The storage controller 155 retrieves requests from the queues in order of the priority level and issues requests for read/write to the physical drives. Usually, requests for host I/O are ranked as priority level 1 (the highest priority) and requests for relocation I/O are ranked as priority level 2 or lower than that. For example, if host I/Os are too many to allow any relocation, the storage controller 155 resets the priority level of the relocation I/Os at 1.

FIG. 11 illustrates an exemplary configuration of the relocation speed determination table 307. The relocation speed determination table 307 is to determine a relocation speed in page relocation. In this example, the storage controller 155 determines a relocation speed based on the number of I/Os of the page, the load to the tier of the relocation source, and the load to the tier of the relocation destination. Either one of the tiers of the source and the destination is a relatively high-class tier; the other is a relatively low-class tier.

The relocation speed determination table 307 includes columns of loads to high-class tier 1101, loads to low-class tier 1102, page I/O counts 1103, and relocation speed numbers 1104. The information stored in the relocation speed number column 1104 is as described with reference to a foregoing drawing.

The column of loads to high-class tier 1101 stores a plurality of levels of load to high-class tiers; each field stores one level. The load to a tier is represented by IOPS, for example. The IOPS of a tier is represented by only host IOPS or the sum of the host IOPS and the relocation IOPS. The storage controller 155 can acquire these values from the parity group monitoring table 304. A load higher than a threshold belongs to a HIGH-LOADED level and a load of the threshold or lower than that belongs to a LOW-LOADED level.

The column of loads to low-class tier 1102 stores a plurality of levels of load to low-class tiers; each field stores one level. A load to a tier is determined in the same way as the load to a high-class tier and the level is determined by the same method as that of a high-class tier. In the case of IOPS, the storage controller 155 can acquire these values from the parity group monitoring table 304. A load higher than a threshold belongs to a HIGH-LOADED level and a load of the threshold or lower than that belongs to a LOW-LOADED level.

The page I/O count column 1103 stores a plurality of levels of page I/O count; each field stores one level. In this example, the page I/O counts are classified into two levels: HIGH and LOW. Page I/O counts greater than a threshold belong to the HIGH level and page I/O counts equal to or smaller than the threshold belong to the LOW level. The level of page I/O count is determined by referring to the granular monitoring table 303.

This example applies a common table to both of relocation from a low-class tier to a high-class tier (promotion) and relocation from a high-class tier to a low-class tier (demotion). Another example may apply respective relocation speed determination tables unique to them. The determination of the relocation speed in this embodiment may be made only for promotion. This example commonly applies the relocation speed determination table to all tier pairs, but another example may apply different relocation speed determination tables unique to individual tier pairs.

In this example, the storage controller 155 determines the relocation speed based on the loads to the two tiers involving relocation and the I/O count on the page to be relocated; however, the storage controller 155 may determine the relocation speed based on a part of these values, for example, only the loads to the both tiers involving the relocation or the load to either one of the tiers. The storage controller 155 may refer to different values, such as the load to the CPU and the load to the path, to determine the relocation speed.

Figure 12:
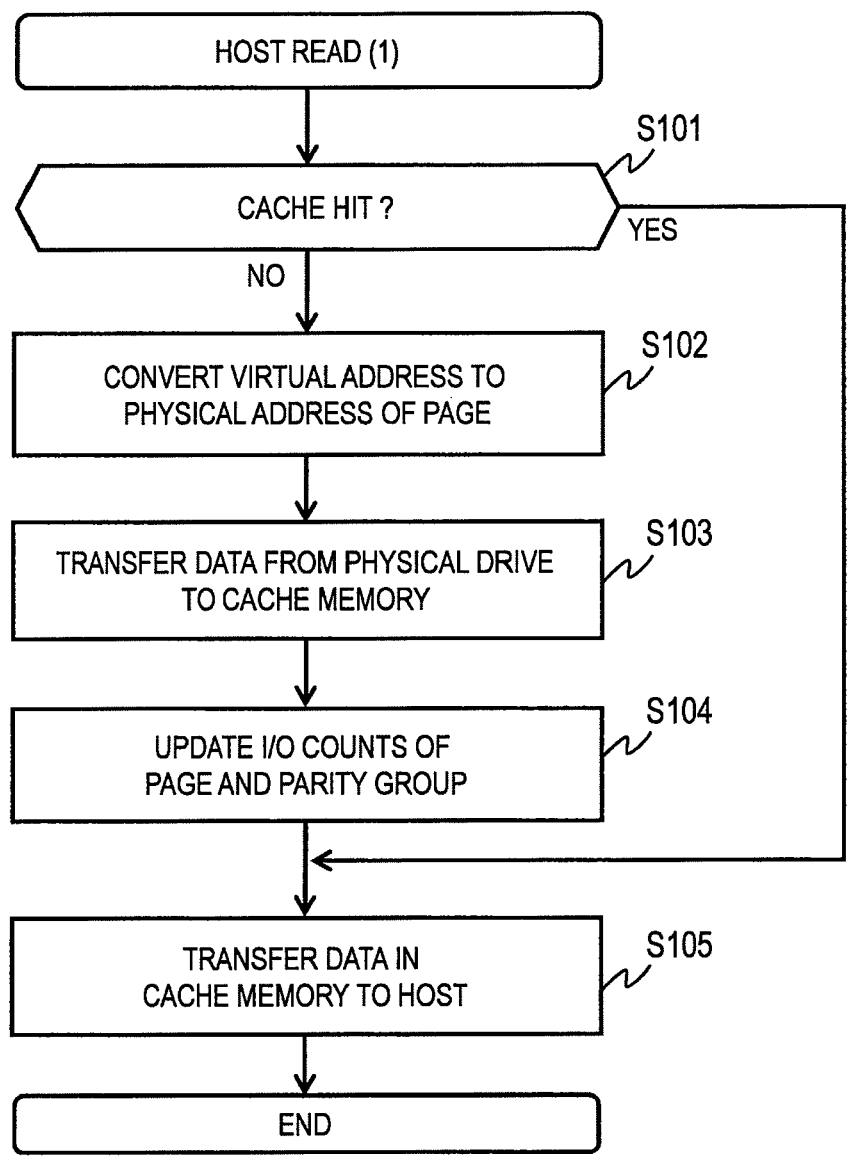
FIG. 12 is a flowchart illustrating exemplary processing (1) of a host read program in the embodiment.

FIG. 12 is a flowchart illustrating exemplary processing (1) of the host read program 401. Upon receipt of a read command specifying a virtual address from the host 100, the host read program 401 operates in accordance with this flowchart.

In this example, upon receipt of a read command from the host 100, the host read program 401 determines whether the data at the address specified by the command is retained in the cache memory 144 with reference to cache management information (not shown) (S101). If the designated data is retained in the cache memory 144 (YES at S101), the host read program 401 transfers the designated data in the cache memory 144 to the host 100 (S105).

If the designated data is not retained in the cache memory 144 (NO at S101), the host read program 401 converts the specified virtual address to a physical address with reference to the virtual-to-logical conversion table 301 and the logical-to-physical conversion table 302 (S102). A physical address specifies a physical storage drive and a storage area in the physical storage drive.

Specifically, the host read program 401 locates the parity group including the data at the specified virtual address with reference to the virtual-to-logical conversion table 301, and further, obtains a logical address corresponding to the virtual address. The host read program 401 calculates a physical storage drive number and an address in the drive indicated by the logical address with reference to the logical-to-physical conversion table 302.

The host read program 401 retrieves data at the calculated physical address from the physical drive and transfers the data to the cache memory 144 (S103). For example, the host read program 401 instructs the drive interface 149 to transfer the read data to the cache memory 144 while specifying a physical address.

The host read program 401 updates the values of the I/O count (the number of host I/Os) being counted on the retrieved page and the I/O count (the number of host I/Os) being counted on the parity group to which the retrieved page belongs to (S104). As described, this example counts I/Os for both of read accesses and write accesses. Values at the end of a monitoring period are stored to the granular monitoring table 303 and the parity group monitoring table 304.

The host read program 401 transfers the data in the cache memory 144 to the host 100 (S105). The host read program 401 transfers the data in the cache memory 144 to the host 100 using the host interface 142.

Figure 13:
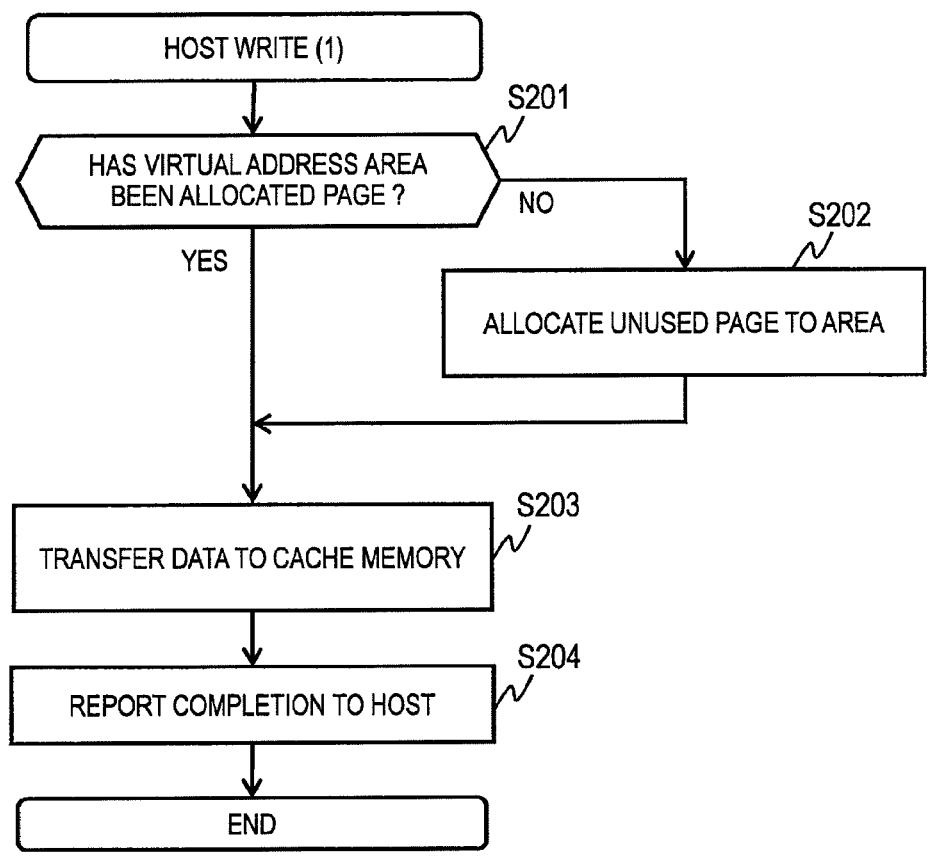
FIG. 13 is a flowchart illustrating exemplary processing (1) of a host write program in the embodiment.

FIG. 13 is a flowchart illustrating exemplary processing (1) of the host write program 402. The host write program 402 handles operations from receipt of a write command and write data from the host 100 until transfer of the write data to the cache memory 144. The host write program 402 receives a write command specifying a virtual address together with user data (write data) from the host 100 and operates in accordance with this flowchart.

The host write program 402 acquires a specified virtual address area with reference to the received write command and determines whether the virtual address area has been allocated a page (real page) with reference to the virtual-to-logical conversion table 301 (S201). If the virtual-to-logical conversion table 301 does not include an entry of the specified address, the virtual address area has not been allocated a page.

If the specified virtual address area has not been allocated a page (NO at S201), the host write program 402 allocates an unused page to the virtual address area and updates the cache management table (not shown) and the virtual-to-logical conversion table 301 (S202). For example, a page is allocated from Tier1.

If the specified virtual address area has been allocated a page (YES at S201) or after an unused page has been allocated to the virtual address area, the host write program 402 transfers the write data to the cache memory 144 (S203). Then, the host write program 402 reports the completion of the write to the host (S204).

Figure 14:
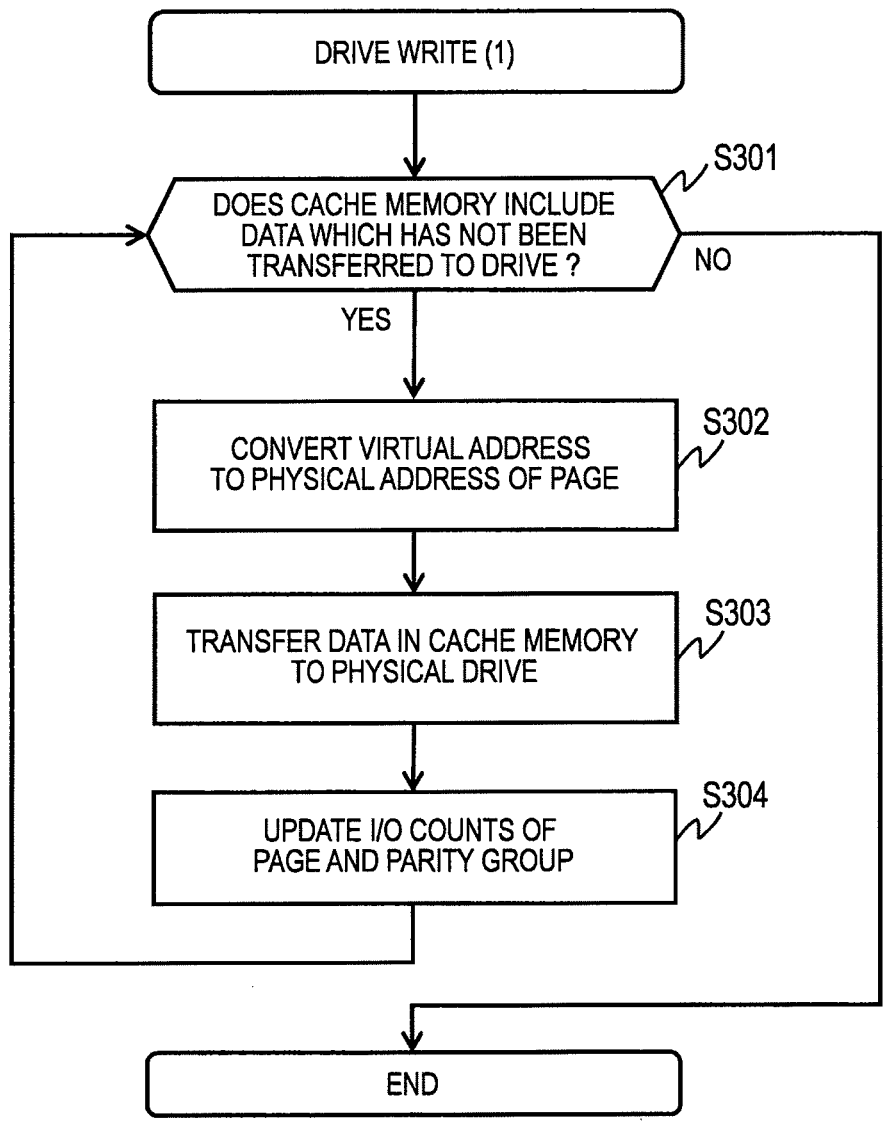
FIG. 14 is a flowchart illustrating exemplary processing (1) of a drive write program in the embodiment.

FIG. 14 is a flowchart illustrating exemplary processing (1) of the drive write program 403. The drive write program 403 handles transfer of write data in the cache memory 144 to a physical storage drive (write to a physical storage drive). As illustrated in FIG. 14, the drive write program 403 determines whether the cache memory 144 includes data which has not been transferred to a physical storage drive with reference to the cache management table (not shown) (S301).

If data that has not been transferred does not exist (NO at S301), the drive write program 403 exits this flow. If data that has not been transferred exists (YES at S301), the drive write program 403 converts the virtual address specified by the write command to the physical address of the page with reference to the virtual-to-logical conversion table 301 and the logical-to-physical conversion table 302 (S302).

Subsequently, the drive write program 403 transfers the data in the cache memory 144 to the physical storage drive using the drive interface 149 (S303). The drive interface 149 sends the write data in the cache memory 144 together with a write command to the foregoing physical address to the physical storage drive.

After the transfer of the write data to the physical storage drive, the drive write program 403 updates the values of the I/O count being counted on the page and the I/O count being counted on the parity group the page belongs to (S304). As described previously, this example sums read accesses and write accesses to count the number of host I/Os and stores the value of the sum at the end of a monitoring period in the granular monitoring table 303 and the parity group monitoring table 304.

Figure 15:
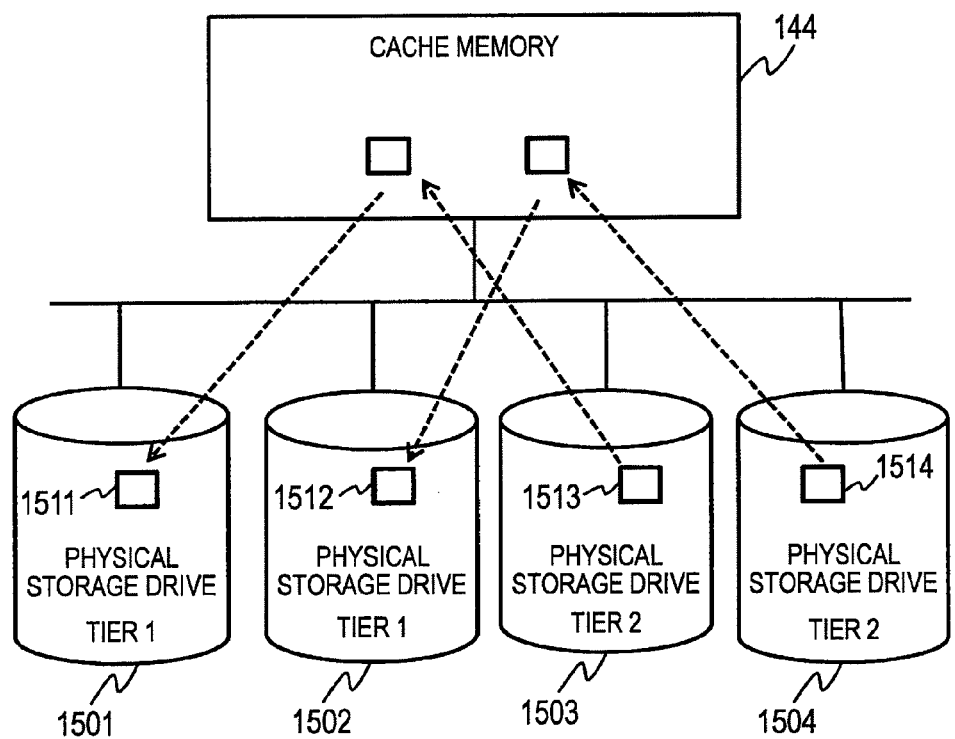
FIG. 15 is a schematic diagram illustrating migration of pages in the embodiment.

FIG. 15 is a schematic diagram illustrating migration of pages. Migration is one of the modes of moving data for relocation. Relocation for promotion moves page data to a higher-class tier and relocation for demotion moves page data to a lower-class tier. FIG. 15 does not show the relocation for demotion.

Migration moves data in a page of the current tier to a free page of a different tier. Migration initializes the data in the source page after writing the same data to the page of the different tier. In most cases, migration of page data is accompanied by migration of other page data in the opposite direction. This counterpart migration maintains a required size of free space in the tier of the migration destination.

Migration retrieves page data to be relocated from a physical storage drive of the relocation source into the cache memory 144, and further, stores it to a physical storage drive of the relocation destination. The example of FIG. 15 retrieves data in the page 1513 in the physical storage drive 1503 of Tier2 to the cache memory 144 and stores it to the page 1511 of the relocation destination in the physical storage drive 1501 of Tier1. It also retrieves data in the page 1514 in the physical storage drive 1504 of Tier2 and stores it to the page 1512 of the relocation destination in the physical storage drive 1502 of Tier1.

After the relocation of the page data, the storage controller 155 updates information on the relevant page in the virtual-to-logical conversion table 301. Specifically, the storage controller 155 rewrites the logical address converted from the address (virtual address) of the virtual page holding the page data to the logical address of the relocation destination page (real page) in the virtual-to-logical conversion table 301.

Figure 16:
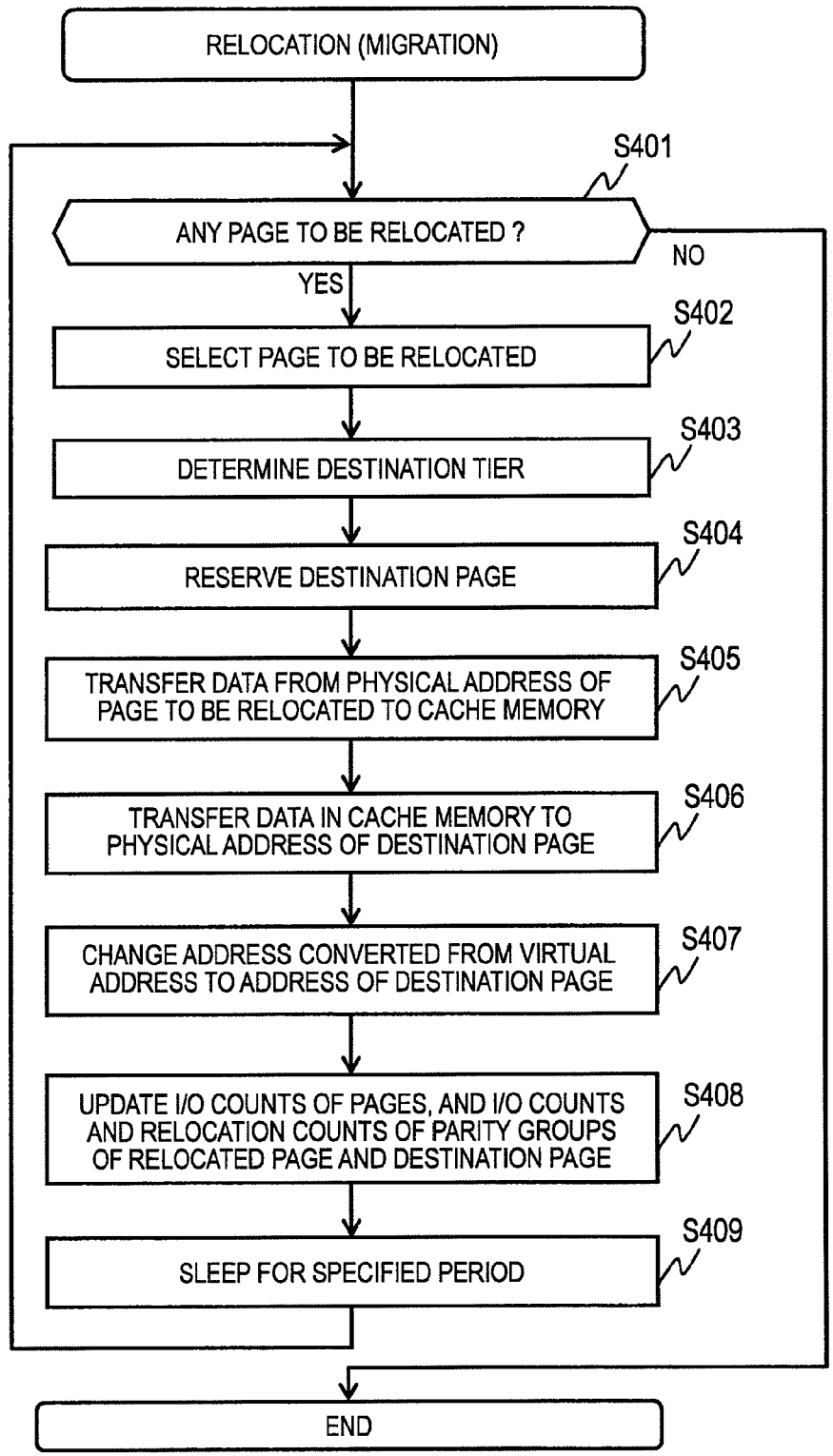
FIG. 16 is a flowchart illustrating exemplary processing (1) of a relocation program in the embodiment.

FIG. 16 is a flowchart illustrating exemplary processing of the relocation program 405. This flow is about a relocation job. The relocation program 405 executes page relocation at a relocation speed determined in accordance with the later-described flow of FIG. 17 or 19. In the example of the relocation speed management table 306 of FIG. 10A, the relocation program 405 executes relocation by the number of jobs within the maximum number of executed jobs, with the sleep time, and at the job priority level defined under the selected relocation speed number.

The relocation program 405 can ascertain the relocation speed number to apply with reference to the relocation job execution management table 305 and can ascertain the details (parameter values) defined under the relocation speed number with reference to the relocation speed management table 306.

The relocation program 405 relocates data in a selected page to a free page of a different tier. The relocation mode in the following description is migration, which has been described with reference to FIG. 15. As will be described later, the relocation program 405 can apply a relocation mode other than migration. The relocation program 405 executes the flow of FIG. 16 responsive to a predetermined event, such as passage of a specified time.

In the flow of FIG. 16, the relocation program 405 determines whether (data in) a page to be relocated exist (S401). If no page to be relocated exists (NO at S401), the relocation program 405 exits this flow. If any page to be relocated exists (YES at S401), the relocation program 405 selects a page to execute relocation (S402).

The relocation program 405 can use a known technique to determine whether to relocate page data; this embodiment omits detailed explanation thereof. For example, the relocation program 405 determines whether to relocate certain page data with reference to the IOPS of the page. The relocation program 405 can ascertain the IOPS of the page from the granular monitoring table 303.

For example, each tier is assigned a range of IOPS (host IOPS); the relocation program 405 compares the IOPS of a page with the range of the IOPS for each tier to determine the tier the page should belong to. If the IOPS of the page is not within the range of the current tier, the relocation program 405 determines to relocate the page data to the tier assigned the range including the IOPS. The relocation program 405 does not need to execute demotion if the used space of the tier is smaller than a specified size.

In another example, the relocation program 405 determines the ranks of pages depending on the IOPS to determine the tier the page should belong to in accordance with the rank. In the case of a three-tier configuration, data for a predetermined number of high-rank pages is stored in the highest-class tier, data for a predetermined number of second-rank pages is stored in the middle-class tier, and data for the remaining pages is stored in the low-class tier.

At step S402, the relocation program 405 selects a page to execute relocation by a predetermined method, for example, in decreasing order of IOPS. The relocation program 405 may select a page with the highest IOPS (host IOPS) from the pages to be relocated. This example selects one page, but a plurality of pages may be selected.

Next, the relocation program 405 determines the destination tier of the selected page data (S403). The method of determining the destination tier is as described above. Next, the relocation program 405 reserves a free page in the destination tier (S404). The relocation program 405 acquires the free page from the area of the destination tier in such a manner that parity groups will disperse with reference to the virtual-to-logical conversion table 301.

The relocation program 405 locates the physical address of the page to be relocated with reference to the logical-to-physical conversion table 302 and transfers data from the area at the physical address to the cache memory 144 (S405). The transfer method from a physical storage drive to the cache memory 144 is as described in the host read (1).

The relocation program 405 calculates the physical address of the destination page from the logical address of the destination page with reference to the logical-to-physical conversion table 302 and transfers (writes) the data in the cache memory 144 to the obtained physical address (S406). Storing the data in the cache memory 144 to the physical storage drive is as described in the drive write (1).

The relocation program 405 updates the information on the relocated page data in the virtual-to-logical conversion table 301 (S407). Specifically, the relocation program 405 changes the logical address converted from the virtual address in the entry of the relocated page from the logical address of the source page to the logical address of the destination page.

Furthermore, the relocation program 405 updates the value of I/Os being counted on the page, the values of I/Os and relocations (source) being counted (the number of relocations (source) in the current monitoring period) for the parity group of the source page, and the values of I/Os and relocations (destination) being counted (the number of relocations (destination) in the current monitoring period) for the parity group of the destination page (S408). For a page relocation, the relocation program 405 increases the I/O count of the page, and increases the I/O counts and the relocation counts of both of the source parity group and the destination parity group.

After the execution of the relocation, the relocation program 405 stands by until execution of the next relocation for a specified time (sleep time) (S409). The relocation program 405 determines the sleep time in accordance with the predetermined relocation speed (refer to FIG. 17). The sleep time is defined in the relocation speed management table 306. After the predetermined sleep time, the relocation program 405 returns to step S401.

Hereinafter, determining a relocation speed by the relocation speed determination program 406 will be described. Different examples of the method of determining a relocation speed are provided; however, the relocation speed determination program 406 may determine the relocation speed by a method still different from these.

Figure 17:
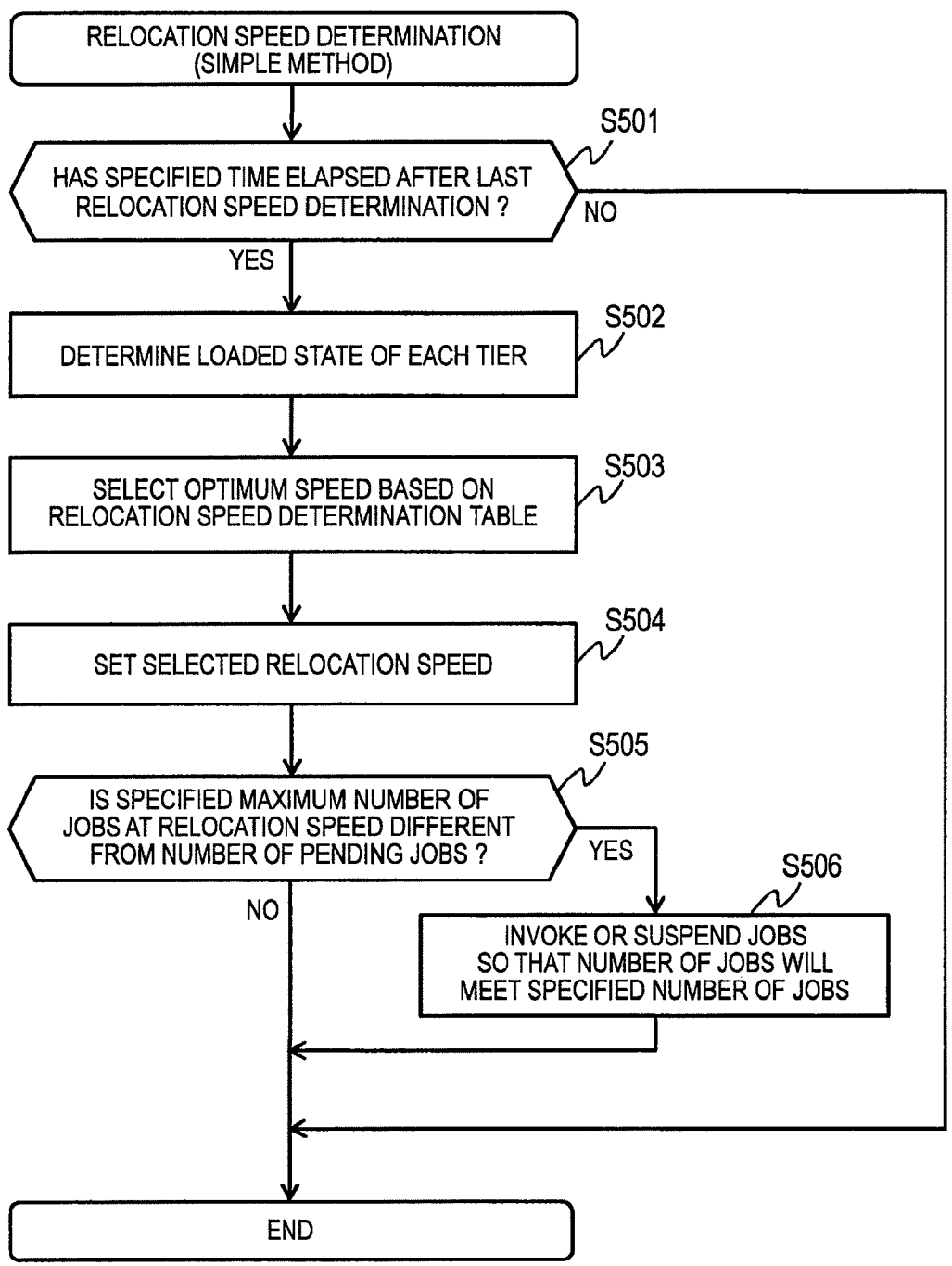
FIG. 17 is a flowchart illustrating determination of a relocation speed in a simple mode performed by a relocation speed determination program in the embodiment.

FIG. 17 is a flowchart illustrating determination of a relocation speed in a simple mode performed by the relocation speed determination program 406. In this flow, the relocation speed determination program 406 determines a relocation speed with reference to the relocation speed determination table 307.

In the flow of FIG. 17, the relocation speed determination program 406 determines whether a specified time has elapsed after the last determination of a relocation speed, such as the last determination of the relocation speed for the next relocation between tiers (S501). If the specified time has not elapsed (NO at S501), the relocation speed determination program 406 exits this flow. If the specified time has elapsed (YES at S501), the relocation speed determination program 406 proceeds to the next step S502. In a different example, the relocation speed determination program 406 may determine a relocation speed for each relocation of a specific number of pages (one or more pages).

At step S502, the relocation speed determination program 406 determines the loads to the source tier and the destination tier for the next relocation. The relocation speed determination program 406 calculates the IOPS of the source tier and the IOPS of the destination tier with reference to the parity group monitoring table 304. The IOPS is a value obtained by dividing the sum of the host I/Os of the all parity groups in the tier and the I/Os caused by relocation (the value in the I/O count column 803) by the monitoring period.

Furthermore, the relocation speed determination program 406 determines the loaded state of each tier from the calculated IOPS with reference to the tier performance management table 309. The tier performance management table 309 is provided for each tier.

Figure 18:
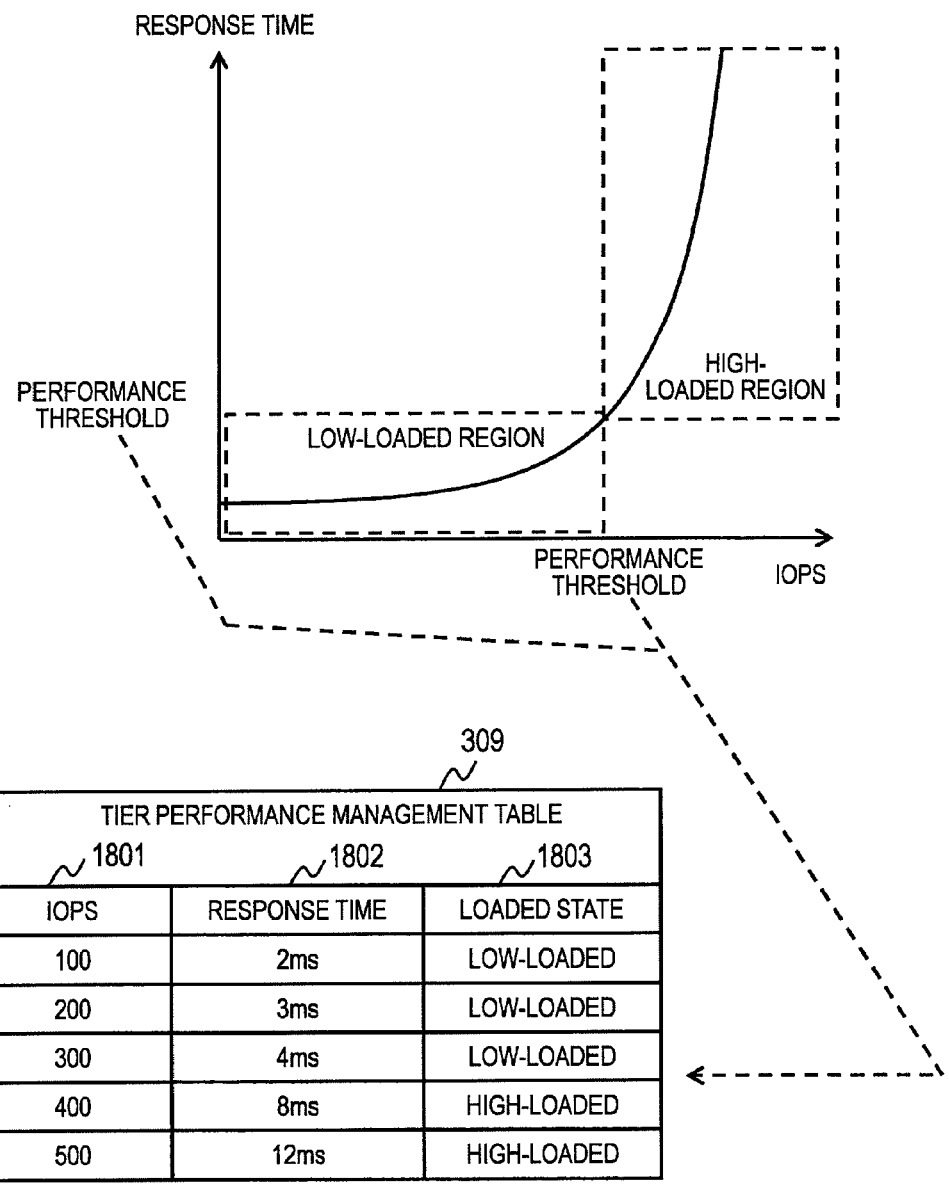
FIG. 18 illustrates an exemplary configuration of a tier performance management table for one tier and a method of creating the table in the embodiment.

FIG. 18 illustrates an exemplary configuration of a tier performance management table 309 for one tier and the method of creating the table. The tier performance management table 309 is originally provided in the storage system 140. In this example, the tier performance management table 309 correlates IOPS, response times (response performance), and loaded states of the tier.

In this example, the tier performance management table 309 includes columns of IOPS 1801, response times 1802, and loaded states 1803. As indicated in the graph in FIG. 18, the tier performance management table 309 is created corresponding to a response curve (IOPS vs. response time). The tier performance management table 309 keeps features extracted from the response curve.

A performance threshold for the IOPS/response time is predetermined and loaded states are defined with reference to the threshold. Values of the IOPS and values of the response time have a one-to-one relationship. Accordingly, if either IOPS or a response time being monitored exceeds the threshold, the loaded state of the tier is high-loaded; if it is equal to or less than the threshold, low-loaded. Since this example monitors the number of I/Os (IOPS) of a tier, the relocation speed determination program 406 determines the loaded state of the tier from a value of the IOPS. The storage controller 155 may monitor the IOPS and the response time, create a response curve from those values, and determine the performance threshold.

The relocation speed determination program 406 acquires the I/O count of the page to be relocated next (current page) from the granular monitoring table 303 to determine whether the number of I/Os is great or small compared with a predetermined threshold. The relocation speed determination program 406 selects an optimum relocation speed from the relocation speed determination table 307 depending on the determined conditions of the I/O count of the page and the loaded states of the tiers (S503).

Next, the relocation speed determination program 406 sets the selected relocation speed for the relocation between the source tier and the destination tier in the pool (S504). Specifically, the relocation speed determination program 406 updates the value of the relocation speed number in the relevant entry in the relocation job execution management table 305.

The relocation speed determination program 406 determines whether the specified maximum number of jobs at the newly determined relocation speed is different from the number of pending jobs (S505). The relocation speed determination program 406 can ascertain the number of pending jobs in the relocation between specific tiers in the pool with reference to the relocation job execution management table 305.

If the specified maximum number of jobs at the relocation speed is different from the number of pending jobs (YES at S505), the relocation speed determination program 406 invokes or suspends jobs so that the number of jobs will meet the specified number (S506).

The foregoing exemplary processing determines the speed of relocation between tiers currently being executed. In another example, the relocation speed determination program 406 may determine relocation speeds for all combinations of tiers. For example, the relocation speed determination program 406 can determine a relocation speed based on the I/O counts of the pages in the previous or the next relocation in each combination of tiers.

Figure 19:
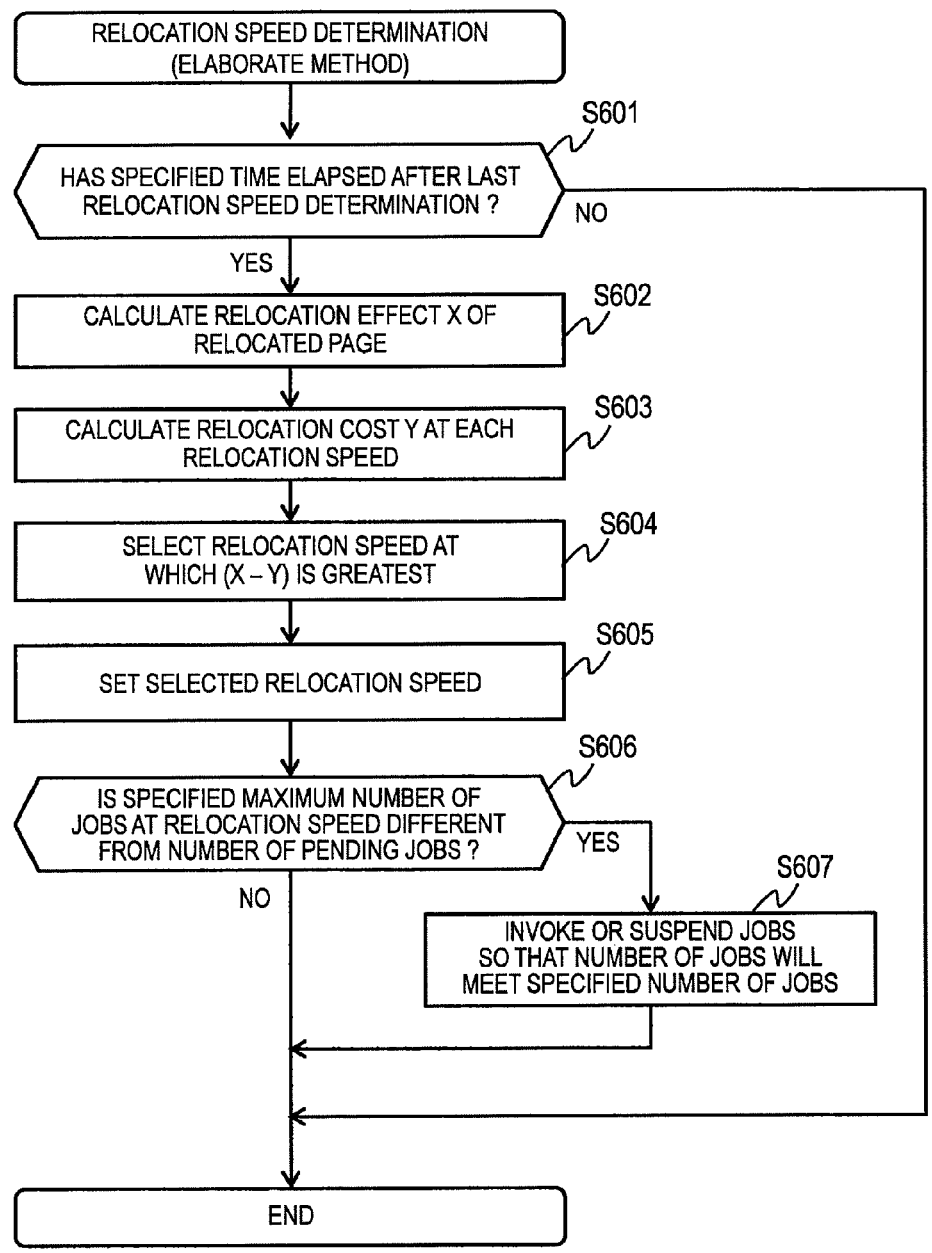
FIG. 19 is a flowchart illustrating other exemplary processing of the relocation speed determination program in the embodiment.

FIG. 19 is a flowchart illustrating other exemplary processing of the relocation speed determination program 406. This method of determining a relocation speed is more elaborate and more adaptive to the situation, compared with the method described with reference to FIGS. 17 and 18.

The flowchart of FIG. 19 is different from the flowchart of FIG. 17 in steps S602 to S604. Accordingly, these steps will be described below.

The relocation speed determination program 406 calculates a relocation effect X on the page to be relocated in accordance with a predetermined formula (S602). The relocation effect X represents a degree of improvement in access performance caused by the relocation. In the case where the relocation consists of promotion and demotion, the relocation effect X may be calculated by the following formula:

$$X = \text{PROMOTE} - \text{DEMOTE}$$
$$= \{(P\_SRC\_RESP - P\_TGT\_RESP) * P\_IOPS\} * PAGE\_NUM -$$
$$\{(D\_SRC\_RESP - D\_TGT\_RESP) * D\_IOPS\} * PAGE\_NUM$$

In a design where the relocation is only promotion or the effect of demotion is ignored, the relocation speed determination program 406 calculates a relocation effect X in accordance with the following formula:

$$X = \text{PROMOTE}$$
$$= (P\_SRC\_RESP - P\_TGT\_RESP) * P\_IOPS * PAGE\_NUM$$

In the above two formulae, PROMOTE denotes an effect of performance improvement caused by promotion; DEMOTE denotes an effect of performance degradation caused by demotion; SRC_RESP denotes a response time of the tier the relocated page belongs to (source tier); TGT_RESP denotes a response time of the tier the destination page belongs to (destination tier); PAGE_IOPS denotes IOPS of the relocated page. P_denotes promotion; D_denotes demotion. PAGE_NUM denotes the number of pages that can be relocated per unit time. The number of pages that can be relocated at a selected relocation speed can be calculated using the maximum number of jobs and the sleep time at the relocation speed, for example. If the relocation is demotion only, PROMOTE should be 0 in the formula of PROMOTE–DEMOTE.

The relocation speed determination program 406 acquires information on IOPS of the source tier and the destination tier from the parity group monitoring table 304. This IOPS is a value obtained by dividing the total sum of the values in the I/O count column 803 for all the parity groups in a tier by a monitoring period. This I/O count is a sum of host I/Os and I/Os caused by relocation.

The relocation speed determination program 406 acquires response times related to the acquired IOPS of the destination tier and the source tier with reference to their respective tier performance management tables 309. The relocation speed determination program 406 acquires IOPS of the page from the granular monitoring table 301.

Next, the relocation speed determination program 406 calculates a relocation cost Y at each relocation speed (S603). The relocation cost Y represents effect of degradation in response performance caused by relocation between tiers. Calculation of the relocation cost Y at each relocation speed will be explained with reference to the graph of FIG. 20 and the flowchart of FIG. 21.

Figure 21:
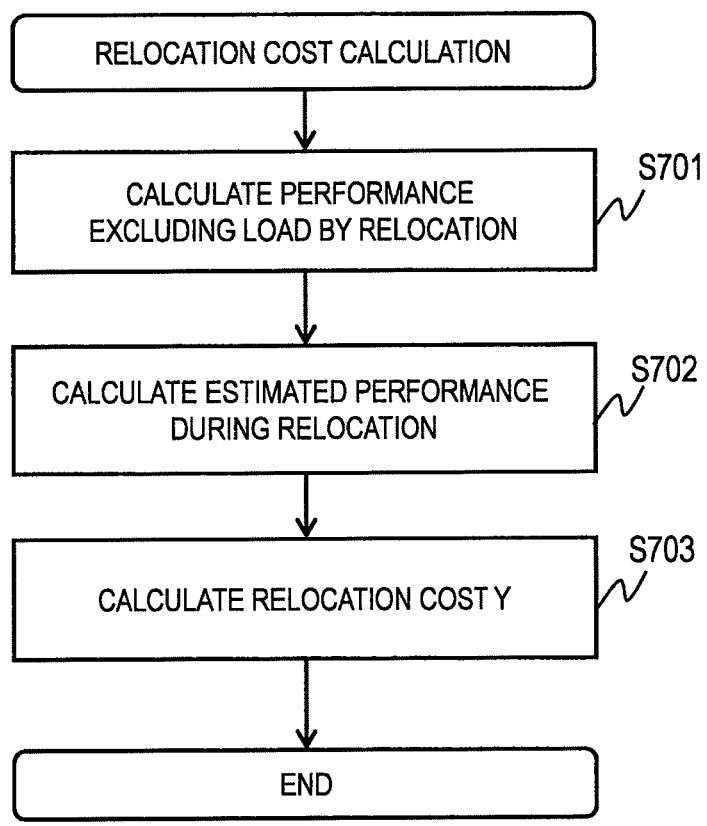
FIG. 21 is a flowchart illustrating exemplary relocation cost calculation in the embodiment.

As illustrated in the flowchart of FIG. 21, the relocation speed determination program 406 calculates a performance excluding relocation load of a high-class tier (S701), calculates an estimated performance during relocation (S702), and calculates the relocation cost Y from those values (S703). The relocation speed determination program 406 may calculate a relocation cost of a low-class tier or an average of the relocation costs of both of the tiers to obtain the relocation cost Y.

Figure 20:
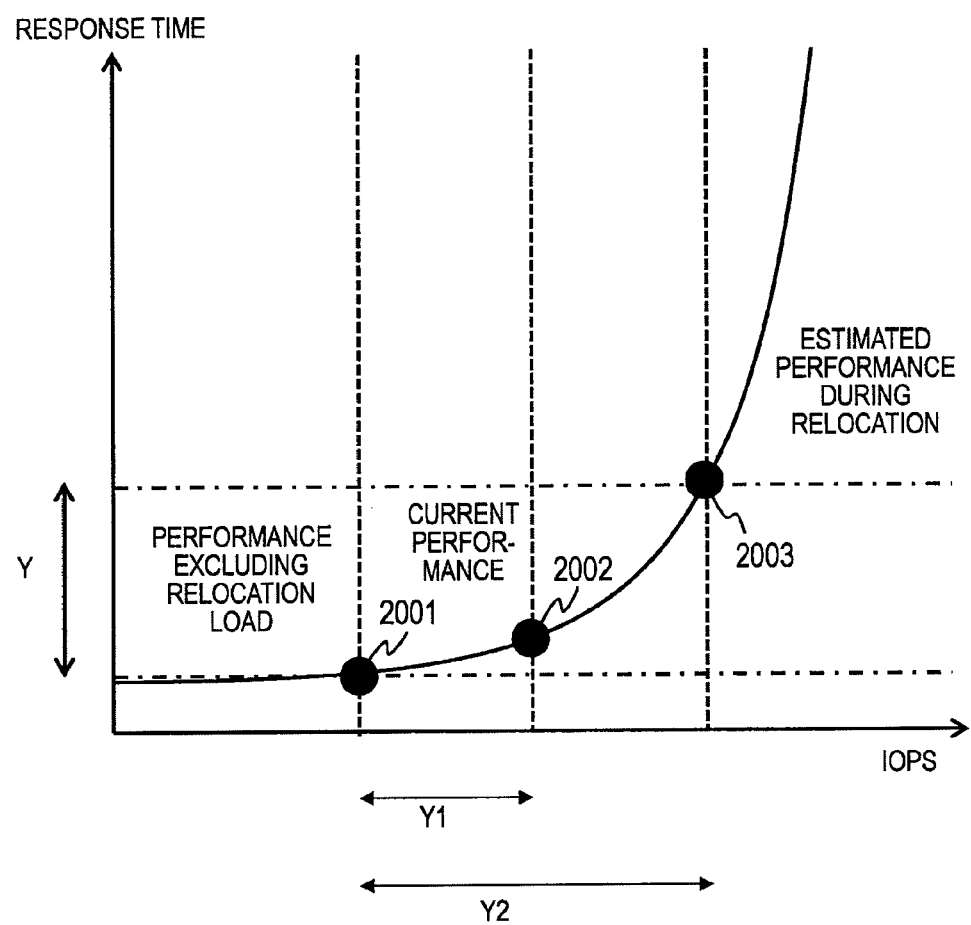
FIG. 20 shows a response curve of a tier in the embodiment.

The graph of FIG. 20 provides a response curve of a high-class tier, wherein the X axis represents IOPS and the Y axis represents response time (host I/O response performance). The relocation speed determination program 406 can obtain approximated values of this response curve from the IOPS with reference to the tier performance management table 309.

In the graph of FIG. 20, the point 2002 represents current response performance of the tier. The IOPS of the current performance is the sum of the host IOPS concerning commands from the host and the IOPS concerning relocation (Y1).

The point 2001 represents performance excluding relocation load. The performance excluding relocation load is response performance at the IOPS obtained by removing the IOPS (Y1) concerning relocation from the IOPS at the current performance 2002. The IOPS at the performance excluding relocation load 2001 is only the host IOPS, indicating the response performance (response time) in the case where no relocation is performed.

The point 2003 represents estimated performance during relocation, which indicates estimated response performance in the relocation which is subsequent to selection of a relocation speed and performed at the selected relocation speed. The IOPS at this point is the sum of the foregoing host IOPS and estimated IOPS (Y2) concerning relocation at the newly selected relocation speed. The relocation cost Y is a value obtained by multiplying a difference in response time between the performance excluding relocation load 2001 and the performance during relocation 2003 by the IOPS at the performance excluding relocation load 2001.

The relocation speed determination program 406 calculates IOPS at the performance excluding relocation load 2001 from values in the parity group monitoring table 304. Specifically, the program 406 can acquire the number of I/Os caused by host commands and by relocation in the tier in the last monitoring period from a value of the I/O count column 803 in the parity group monitoring table 304.

Furthermore, the program 406 can acquire the number of I/Os in the tier caused by relocation from the relocation count (source) column 804 and the of relocation count (destination) column 805. The value obtained by deducting the number of I/Os in the tier caused by relocation from the foregoing number of I/Os is the number of host I/Os and the value obtained by dividing the number of host I/Os by the monitoring period is the IOPS at the performance excluding relocation load 2001.

The relocation speed determination program 406 further calculates a response time related to the IOPS with reference to the tier performance management table 309. This value is the response time at the performance excluding relocation load 2001.

Next, the relocation speed determination program 406 calculates estimated additional IOPS (Y2) concerning relocation at the selected relocation speed and adds it to the IOPS at the performance excluding relocation load 2001. The relocation speed determination program 406 calculates the response time related to the total IOPS with reference to the tier performance management table 309. The obtained value is the response time at the estimated performance during relocation 2003 and the value obtained by deducting the response time at the performance excluding relocation load 2001 from the foregoing obtained value is the relocation cost Y.

The relocation speed determination program 406 can calculate the estimated additional IOPS (Y2) concerning relocation at the selected relocation speed, for example, using the maximum number of jobs and the sleep time at the relocation speed. The relocation speed determination program 406 holds IOPS per job for each tier pair. These values are predetermined.

The IOPS in the relocation at the selected relocation speed is represented by: The maximum number of jobs*IOPS per job*(1/(1+sleep time)). For example, assuming that IOPS per job is 10 IOPS, the maximum number of jobs is 2, and the sleep time is 100 ms, the IOPS should be 2*10 IOPS*(1 s/(1 s+100 ms)).

Finally, the relocation speed determination program 406 obtains a value (X−Y) by deducting the relocation cost Y calculated at step S603 from the relocation effect X calculated at step S602, and selects a relocation speed at which the value is the greatest (S604).

The relocation speed determination program 406 can calculate the relocation cost Y by a method different from the foregoing example. For example, the relocation speed determination program 406 can calculate the relocation cost Y in accordance with the following math. 1 and math. 2. These formulae are to calculate an effect to the high class tier TierM using a queuing model in the case of two tiers.

$$Y = \frac{r_{rel}(N)}{(m_{rel/TierM})^2 \cdot d_{TierM}\left(1 - \frac{r_{host/TierM}}{d_{TierM} m_{host/TierM}}\right)} \quad [\text{Math.1}]$$

$$r_{rel}(N) = \min\begin{pmatrix} N\left(1 - \frac{r_{host/Tier1}}{m_{host/Tier1} d_{Tier1}}\right) m_{rel/Tier1}, \\ d_{Tier1}\left(1 - \frac{r_{host/Tier1}}{m_{host/Tier1} d_{Tier1}}\right) m_{rel/Tier1} \\ N\left(1 - \frac{r_{host/Tier2}}{m_{host/Tier1} d_{Tier2}}\right) m_{rel/Tier2}, \\ d_{Tier2}\left(1 - \frac{r_{host/Tier2}}{m_{host/Tier2} d_{Tier2}}\right) m_{rel/Tier2} \end{pmatrix} \quad [\text{Math.2}]$$

In the above formulae, rhost/TierM denotes the host I/Os (IOPS) of the high class tier TierM, mhost/TierM denotes the performance capability (IOPS) of each physical drive in TierM (where only relocation is executed), mrel/TierM denotes the performance capability (IOPS) of each physical drive in TierM (where only host I/Os are issued), dTierM denotes the number of physical drives in TierM, and N denotes the number of jobs. N (=the number of jobs) should be input. The function min( ) is a function to select a minimum value in an argument; it returns the minimum value of the four values in this formula.

Next, determining a relocation mode (mode of moving data in relocation) will be described. The method is performed by the relocation mode determination program 408. In the following description, a method of determining a relocation mode in relocation of promotion. The same method is applicable to relocation of demotion. The relocation program 405 performs relocation in a relocation mode determined by the relocation mode determination program 408. The relocation mode determination program 408 selects an appropriate relocation mode from a plurality of relocation modes in accordance with the load (IOPS) to the tier.

This example provides a migration mode, a swap mode, a copy mode and selects an appropriate mode therefrom. The number and the kinds of relocation modes in a selection depend on the design. For example, the relocation mode may be chosen from either the combination of migration mode and the swap mode or the combination of the migration mode and the copy mode.

Figure 22:
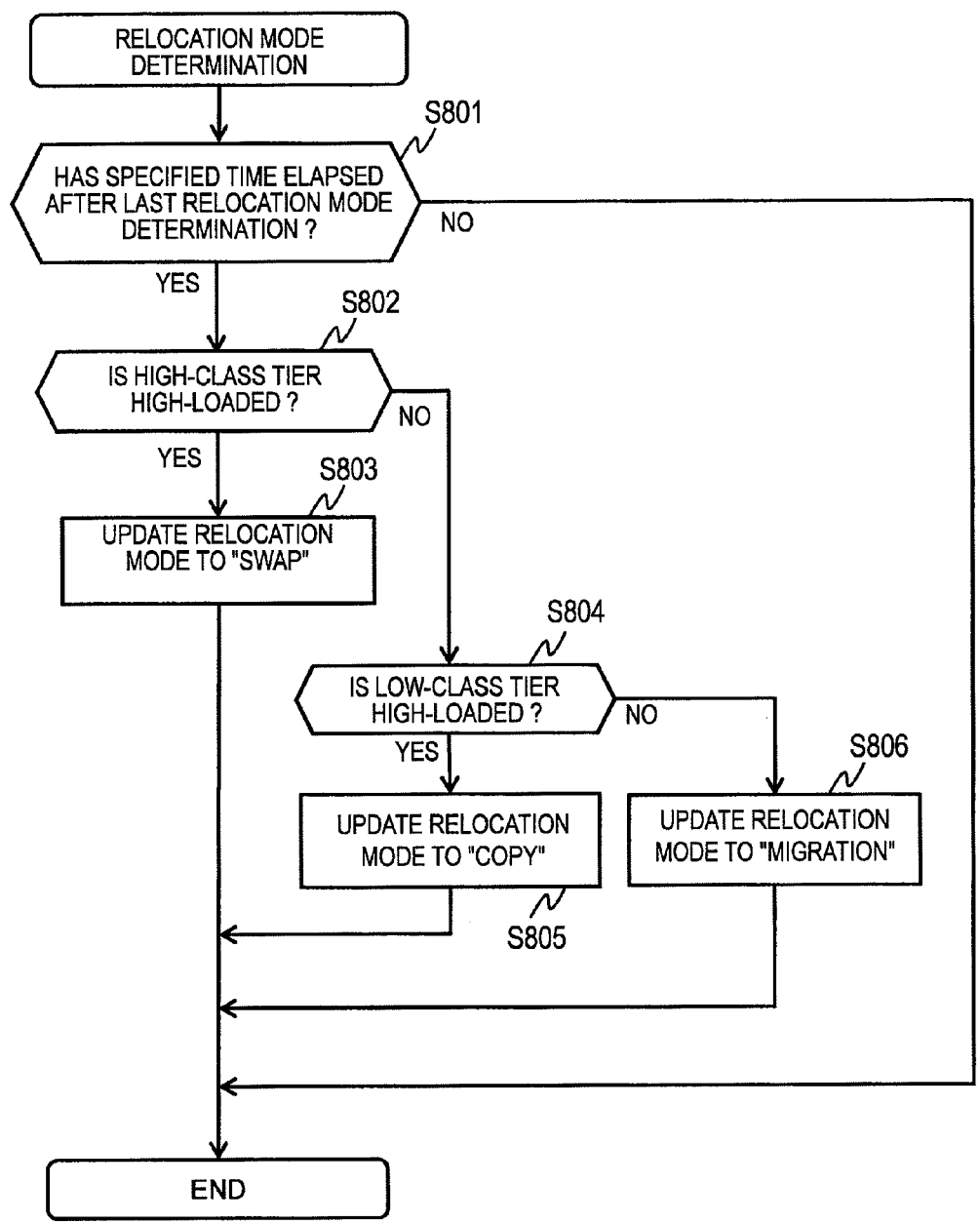
FIG. 22 is a flowchart illustrating exemplary relocation mode determination performed by a relocation mode determination program in the embodiment.

FIG. 22 is a flowchart illustrating exemplary relocation mode determination performed by the relocation mode determination program 408. The relocation mode determination program 408 selects a relocation mode in accordance with the loads to the tiers involving relocation. An appropriate relocation mode achieves smaller effect of relocation to the host I/O performance.

In the flowchart of FIG. 22, the relocation mode determination program 408 determines whether a specified time has elapsed after the last relocation mode determination (S801). For example, it refers to the elapsed time after the last relocation mode determination for the same tier pair. If the specified time has not elapsed (NO at S801), the relocation mode determination program 408 exits this flow. The relocation mode determination program 408 may determine the relocation mode for each page relocation.

If the specific time has elapsed (YES at S801), the relocation mode determination program 408 determines whether the high-class tier is high-loaded (S802). The determination of load is made with reference to the parity group monitoring table 304 and the tier performance management table 309 as explained with reference to the flowchart of FIG. 17.

If the high-class tier is high-loaded (YES at S802), the relocation mode determination program 408 updates the value of the relocation mode column 904 of the relevant entry in the relocation job execution management table 305 for the pool into SWAP (S803). The swap mode does not require erasure of data in the pages to be relocated; accordingly, it achieves low load to the physical storage drives.

If the high-class tier is low-loaded (NO at S802) and the low-class tier is high-loaded (YES at S804), the relocation mode determination program 408 updates the value in the relocation mode column 904 of the relevant entry in the relocation job execution management table 305 for the pool into COPY (S805). The copy mode also does not require erasure of data to be relocated; it achieves low load to the physical storage drives. Since data is held in two tiers, the copy mode requires a larger capacity than the other modes.

If the high-class tier is low-loaded (NO at S802) and the low-class tier is low-loaded (NO at S804), the relocation mode determination program 408 updates the value in the relocation mode column 904 of the relevant entry in the relocation job execution management table 305 for the pool into MIGRATION (S806). This operation allows only necessary data to be relocated.

In typical relocation in the migration mode, there occur data move from the low-class tier to the high-class tier and data move from the high-class tier to the low-class tier. The swap mode does not require page initialization (data erasure) like the migration mode; accordingly, it achieves low load to the physical storage drives.

As will be described later, the copy mode can use the high-class tier as a cache area. Since the copy mode can move data from the high-class tier to the low-class tier without reducing the promotion speed, it achieves low load to the physical storage drives of the low-class tier. Since the copy mode requires more capacity for storing data than the swap mode, other mode is preferable in terms of the capacity.

Figure 23:
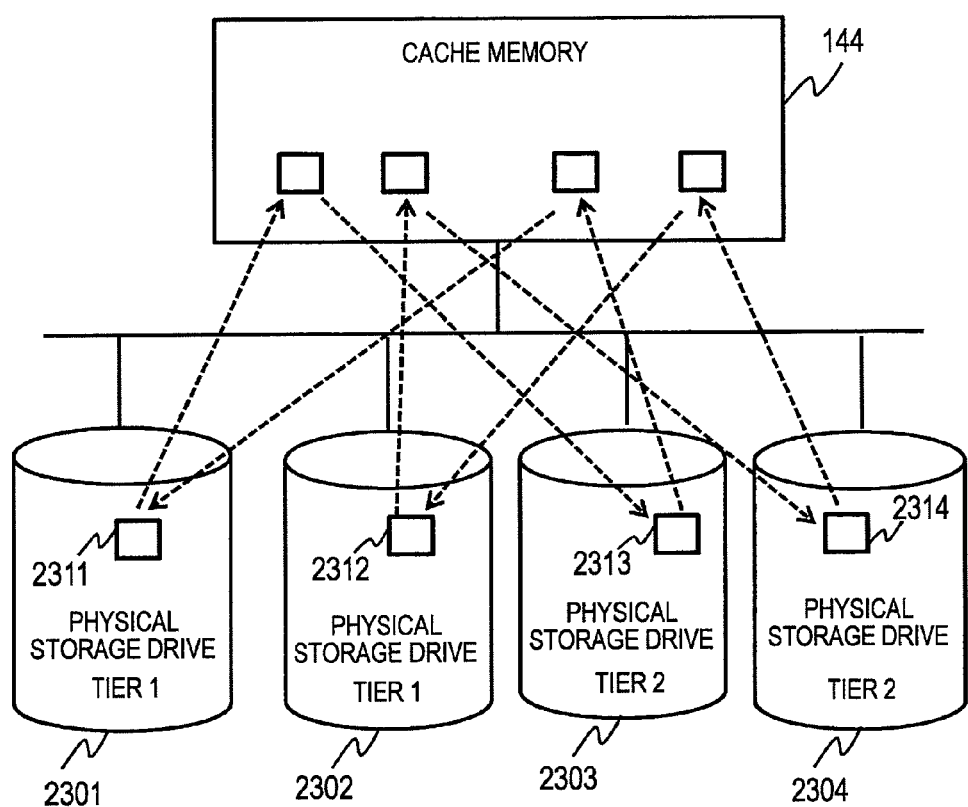
FIG. 23 is a drawing illustrating an overview of relocation of page data in a swap mode in the embodiment.

FIG. 23 is a drawing illustrating an overview of relocation of page data in the swap mode. This example illustrates page data relocation between Tier1 and Tier2. In this example, the storage controller 155 retrieves data in a page 2311 to be relocated in Tier1 to the cache memory 144. Furthermore, it retrieves data in a page 2313 to be relocated in Tier2 to the cache memory 144.

Next, the storage controller 155 stores the data of the relocation object page of Tier2 held in the cache memory 144 to the address of the relocation object page 2311 in the physical storage drive 2301 of Tier1. Furthermore, it stores the data of the object page of Tier1 held in the cache memory 144 to the address of the object page 2313 in the physical storage drive 2303 of Tier2. The same applies to pages 2312 and 2314.

Figure 24:
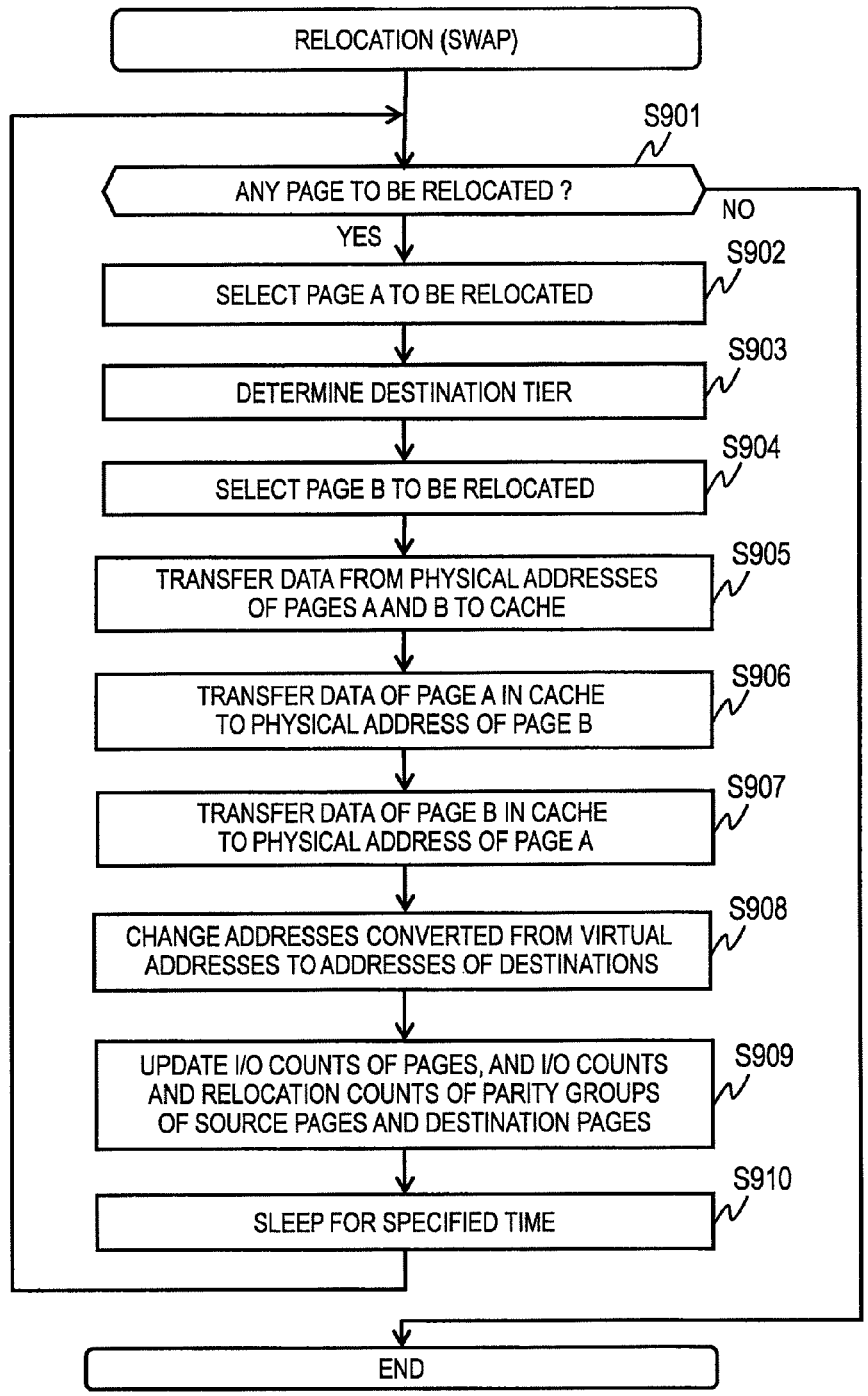
FIG. 24 is a flowchart illustrating exemplary relocation in the swap mode in the embodiment.

Now with reference to the flowchart of FIG. 24, an exemplary flow of relocation in the swap mode will be described. Steps S901 to S903 are the same as steps S401 to S403 in the flowchart of migration of FIG. 16.

At step S904, the relocation program 405 selects a page B to be relocated from the destination tier of a page A to be relocated. For example, the relocation program 405 can select a page to be relocated based on the page IOPS; the program 405 selects a page with the least IOPS to promote the page A.

Next, the relocation program 405 transfers data from the physical addresses of the pages A and B to the cache memory 144 (S905). The relocation program 405 transfers the data of the page A held in the cache memory 144 to the physical address of the page B (S906) and transfers the data of the page B held in the cache memory 144 to the physical address of the page A (S907). Through these steps, the data in the pages A and B are relocated to the physical addresses of their respective counterpart pages.

Next, regarding the virtual-to-logical conversion table 301, the relocation program 405 changes the logical addresses converted from the virtual addresses of the data of the relocated pages A and B into those of the destination pages (S908). Specifically, in each entry of the relocated pages, the relocation program 405 changes the logical address converted from the virtual address to the logical address from the logical address of the source to the logical address of the destination.

The relocation program 405 updates the following values for each of the pages A and B: the values of I/Os being counted for the page (including read and write accesses), the values of I/Os and relocations (source) being counted (the number of relocations (source) in the current monitoring period) for the parity group of the source page, and the values of I/Os and the relocations (destination) being counted (the number of relocations (destination) in the current monitoring period) for the parity group of the destination page (S909). This step is the same as step S408 in FIG. 16.

The relocation program 405 stands by for a specified time (sleep time) until execution of the next relocation after the completion of the present relocation (S910). The relocation program 405 determines the sleep time in accordance with a predetermined relocation speed (refer to FIG. 17). The sleep time is defined in the relocation speed management table 306. After the specified sleep time, the relocation program 405 returns to step S901.

Figure 25:
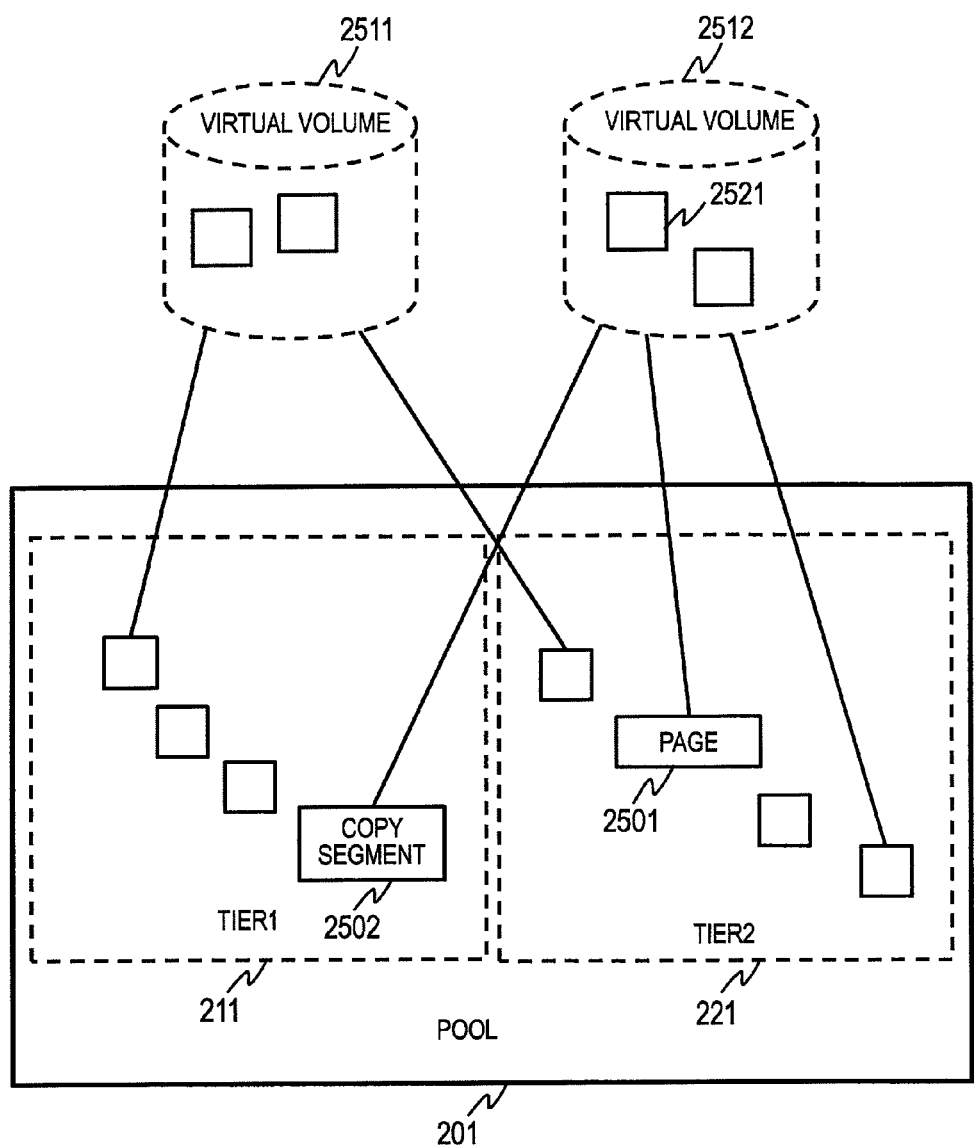
FIG. 25 is a drawing illustrating an overview of relocation in a copy mode in the embodiment.

FIG. 25 is a drawing illustrating an overview of relocation in the copy mode. Hereinafter, an area in a physical storage drive to be a copy destination is referred to as a copy segment. In this example, a copy segment has the same area size as a page. Accordingly, the storage controller 155 reserves a page to use it as a copy segment.

In the example of FIG. 25, virtual volumes 2511 and 2512 have been allocated real pages from a tier 211 (Tier1) and a tier 221 (Tier2) in a pool 201. A virtual page 2521 in the virtual volume 2512 has been allocated a real page 2501 in the tier 221 (Tier2). A copy segment (real page) 2502 in the tier 211 (Tier1) is a copy destination (relocation destination) of the page 2501 and has been allocated to the virtual page 2521.

Since the copy segment 2502 is the relocation destination of the page 2501, the storage controller 155 accesses the copy segment 2502 in response to a read command or a write command to the virtual page 2521 from the host 100. The storage controller 155 performs operations to eliminate discrepancy between the copy segment 2502 and the page 2501.

In this example, the storage controller 155 deletes data in an existing copy segment when a new copy segment is created or when a predetermined period has elapsed. In the latter example, when a period of no-access to a copy segment reaches a threshold or when a monitoring period ends, the storage controller 155 initializes the copy segment. In this way, the storage controller 155 uses a high-class tier as a cache to increase access performance.

FIG. 26 illustrates an exemplary configuration of the copy segment management table 308 to manage copy segments. The copy segment management table 308 includes columns of page numbers 3301, virtual volume numbers 3302, virtual addresses 3303, presence of copy 3304, states of segment 3305, parity group numbers 3306, and logical addresses 3307.

In each entry, the virtual volume number column 3302 stores a virtual volume number the particular page belongs to and the virtual address column 3303 stores a start address (virtual address) of the page in the virtual volume. The column of presence of copy 3304 stores data indicating whether a copy segment for the page exists or not. YES indicates that a copy segment for the page exists; NO indicates that no copy segment exists.

The state-of-segment column 3305 stores data indicating whether the data in a copy source page (relocation source page) is identical to the data in its copy segment (relocation destination page). CLEAN indicates identical; DIRTY indicates different. The parity group number column 3306 stores an identifier of the parity group the copy segment belongs to and the logical address column 3307 stores a value of the logical start address of the copy segment.

Figure 27:
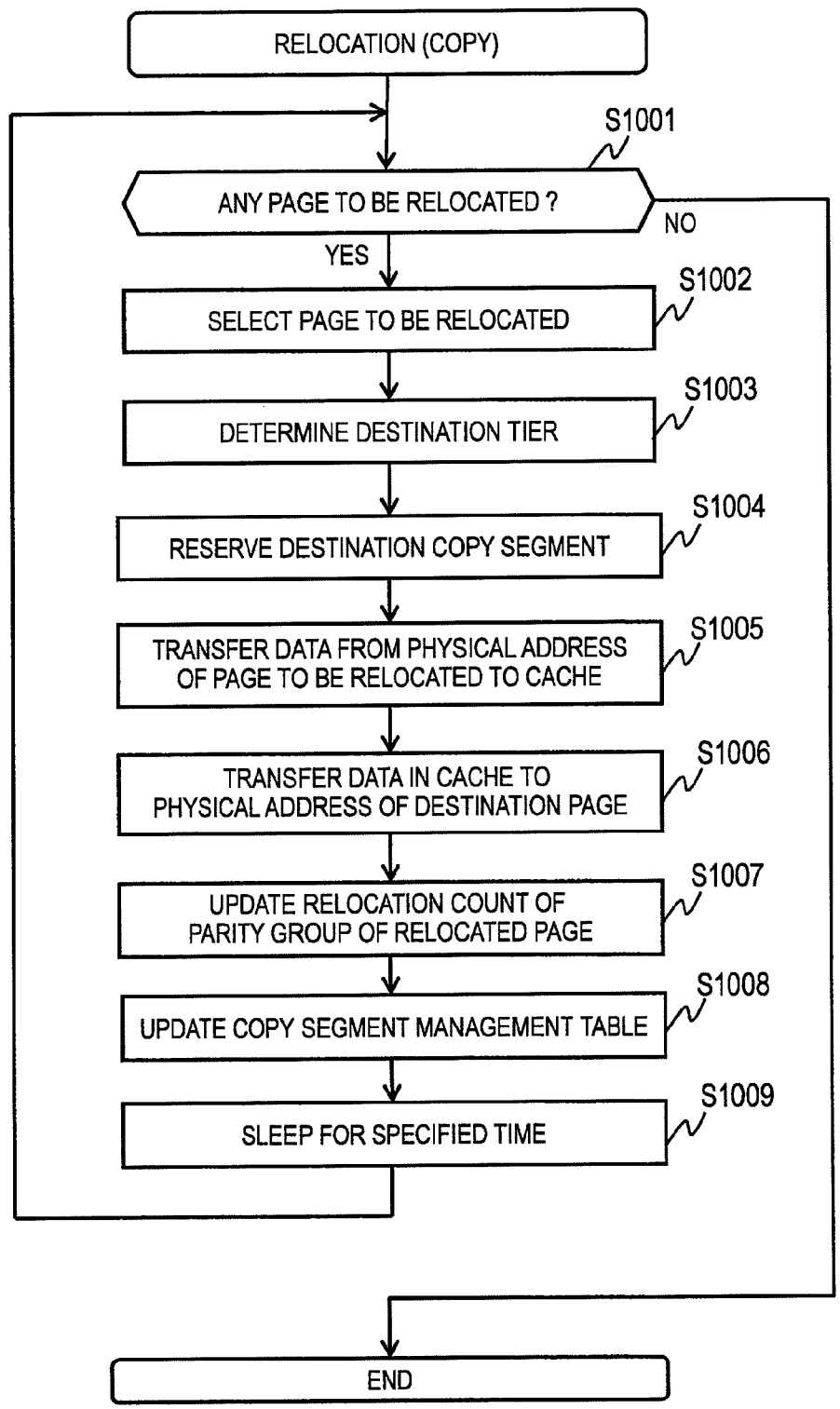
FIG. 27 is a flowchart illustrating exemplary relocation in the copy mode in the embodiment.

Now with reference to the flowchart of FIG. 27, exemplary relocation in the copy mode will be described. In the following description, differences from the flowchart of migration of FIG. 16 will be explained. Steps S1001 to S1003 are the same as steps S401 to S403 in the flowchart of migration of FIG. 16.

At step S1004, the relocation program 405 reserves a copy segment in the destination tier. Since the copy segment and the page are the same in size in this example, this step S1004 is the same as step S404.

Steps S1005, S1006, and S1007 are the same as steps S405, S406, and S408, respectively. In this flow, the relocation program 405 does not change the logical address of the page converted from the virtual address but maintains the logical address of the source page.

The relocation program 405 updates the copy segment management table 308 after the completion of the copy of page data (S1008). The relocation program 405 updates information in the entry of the relevant page in the copy segment management table 308.

Specifically, the relocation program 405 sets YES to the presence-of-copy column 3004, CLEAN to the state-of-segment column 3005, the parity group number of the copy destination page to the parity group column 3006, and the logical start address of the copy destination page to the logical address column 3007 in the relevant entry. Step S1009 is the same as step S409.

Now with reference to the flowchart of FIG. 28, exemplary host read (2) to a virtual page having a copy segment will be described. In the following description, differences from the host read (1) explained with reference to FIG. 12 will be particularly explained. Major differences are to check presence of a copy segment and, if a copy segment is present, to retrieve data from the copy segment.

Figure 28:
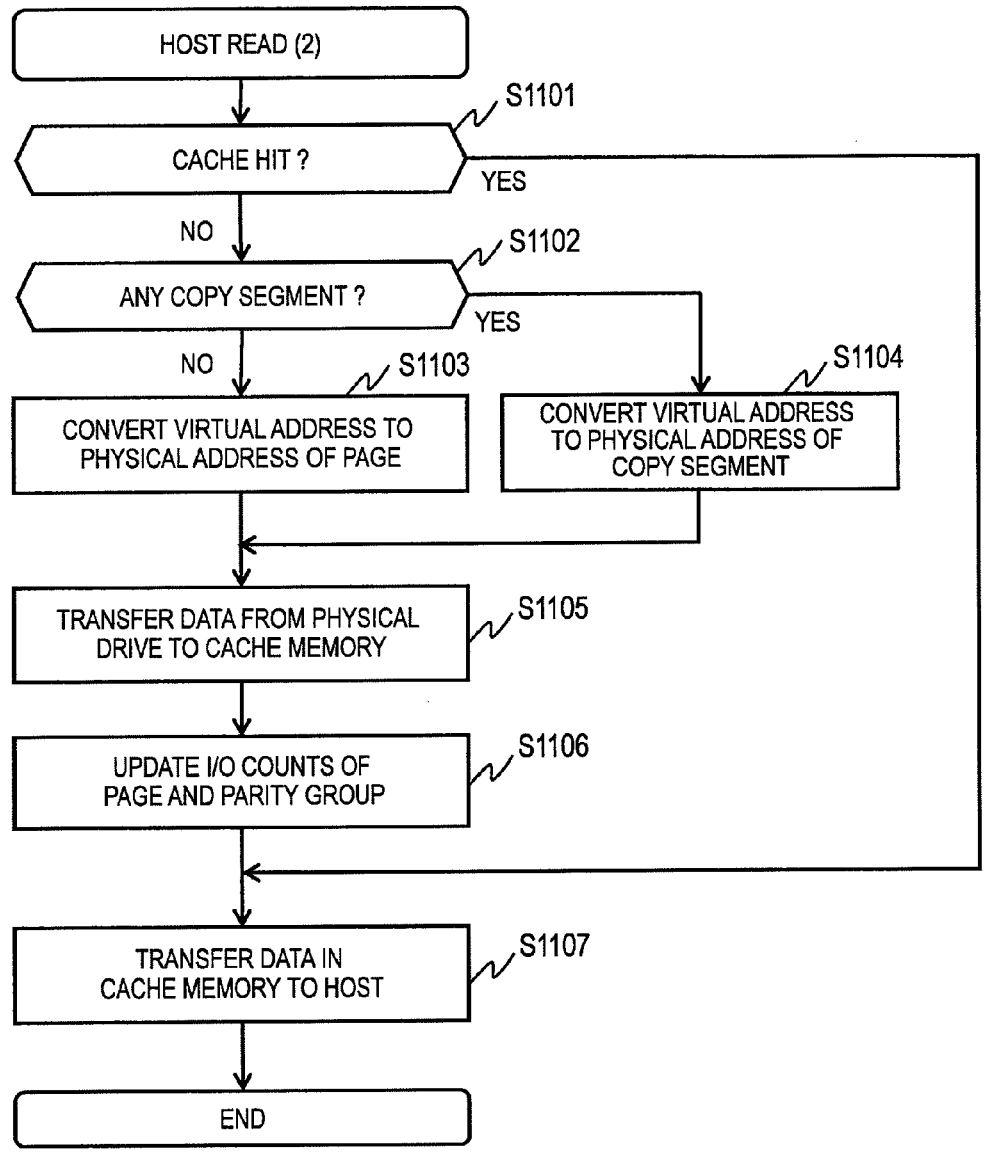
FIG. 28 is a flowchart illustrating exemplary host read (2) for a virtual page having a copy segment in the embodiment.

In the flowchart of FIG. 28, step S1101 is the same as step S101 in FIG. 12. At step S1102, the host read program 401 determines whether any copy segment allocated to the virtual page to be accessed exists with reference to the copy segment management table 308.

If no allocated copy segment exists (NO at S1102), the host read program 401 proceeds to step S1103. Step S1103 is the same as step S102. If an allocated copy segment exists (YES at S1102), the host read program 401 converts the virtual address to the physical address of the copy segment (S1104).

Specifically, the host read program 401 locates a logical address (start address) of the copy segment corresponding to the virtual page with reference to the copy segment management table 308. The host read program 401 converts the logical address of the copy segment to a physical address with reference to the logical-to-physical conversion table 302. The subsequent steps S1105 to S1107 are the same as steps S103 to S105 in FIG. 12. At step S1106, the storage controller 155 updates the I/O count of the copy segment and the parity group the copy segment belongs to.

Next, with reference to the flowchart of FIG. 29, exemplary host write (2) responsive to a write command to a virtual page having a copy segment will be described. In the following description, differences from the host write (1) explained with reference to FIG. 13 will be particularly explained. The major difference is to update the state of segment of the entry into DIRTY in the copy segment management table 308.

Figure 29:
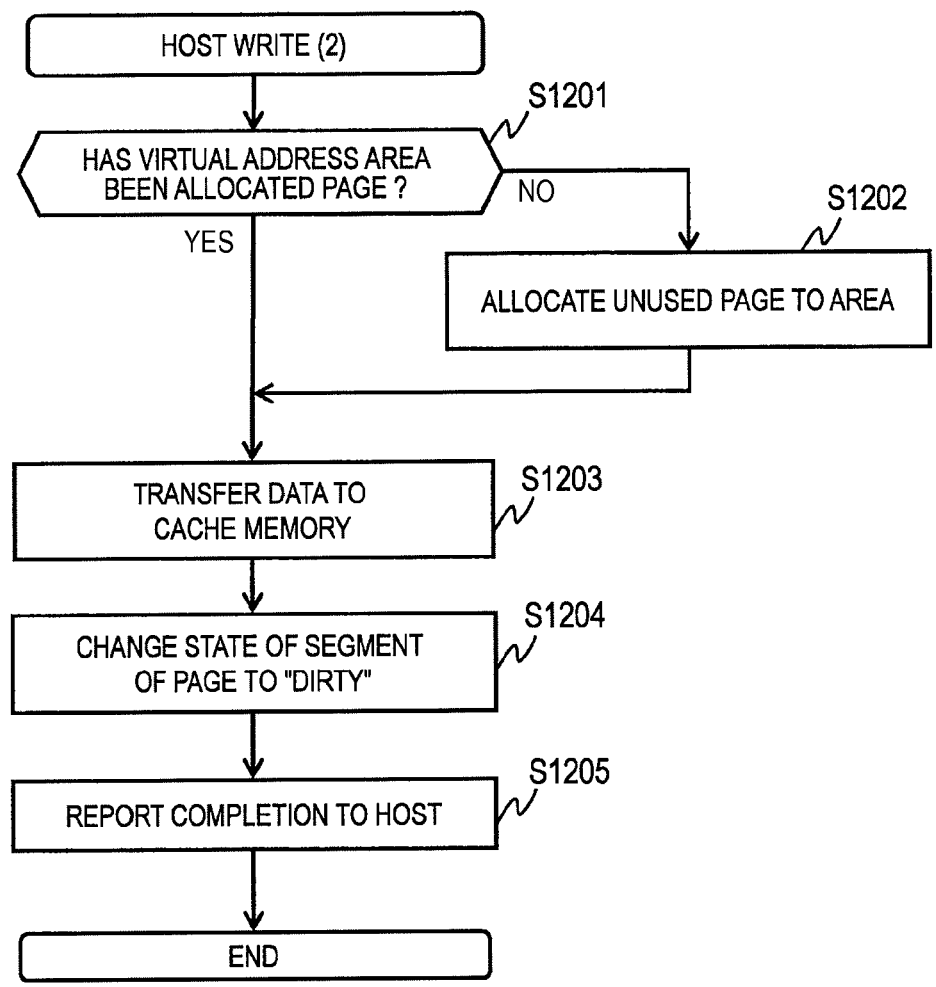
FIG. 29 is a flowchart illustrating exemplary host write (2) responsive to a write command to a virtual page having a copy segment in the embodiment.

In the flowchart of FIG. 29, steps S1201 to S1203 are the same as steps S201 to S203 in the flowchart of FIG. 13. At step S1204, the host write program 402 updates the data in the state-of-segment column 3305 in the relevant page entry to DIRTY in the copy segment management table 308. At step S1205 is the same as step S204 in the flowchart of FIG. 13.

Next, with reference to the flowchart of FIG. 30, exemplary drive write (2) responsive to a write command to a virtual page having a copy segment will be described. In the following description, differences from the drive write (1) explained with reference to FIG. 14 will be particularly explained. The main differences are to check the presence of a copy segment and, if a copy segment is present, to write user data to the copy segment.

Figure 30:
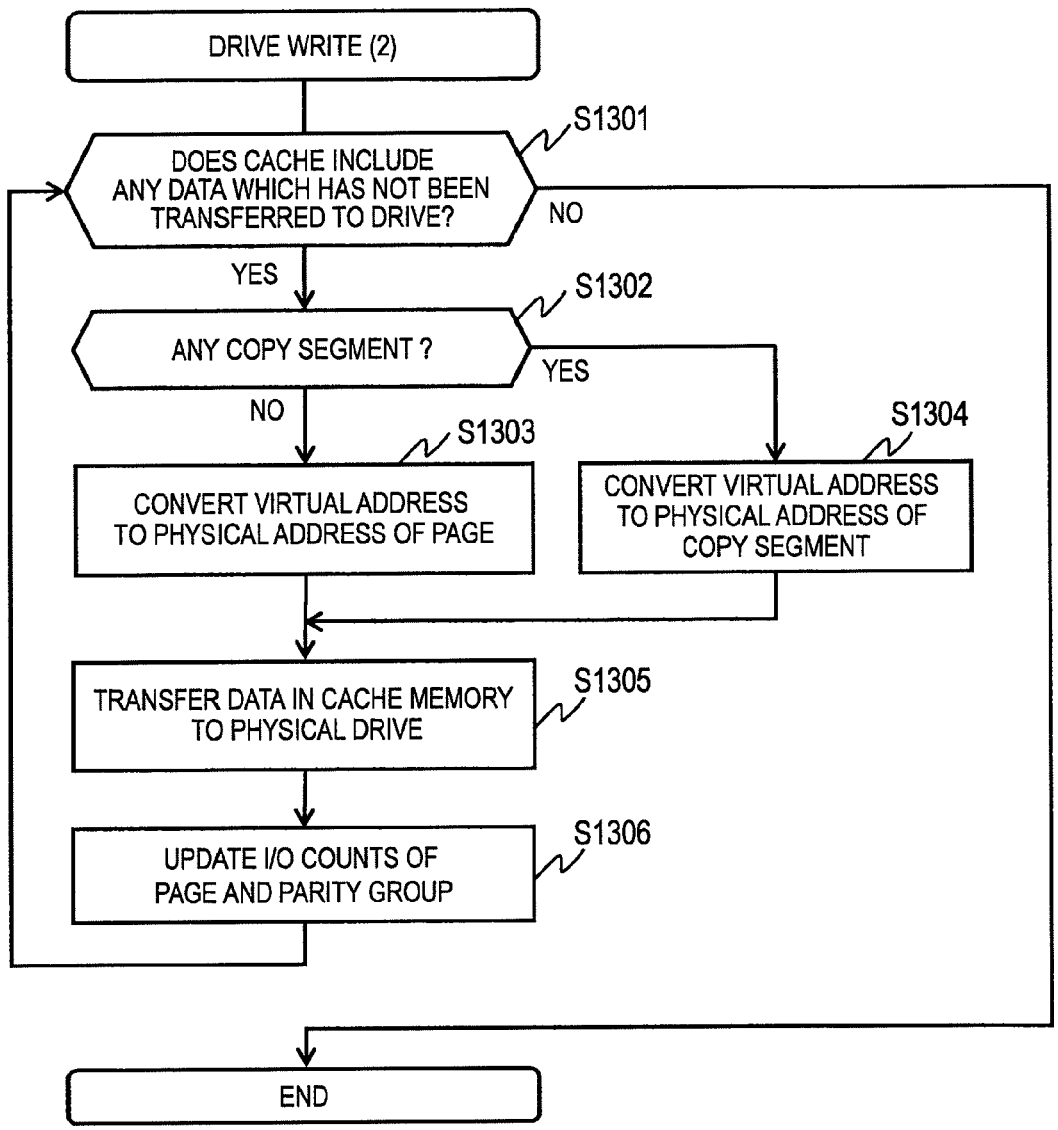
FIG. 30 is a flowchart illustrating exemplary drive write (2) responsive to a write command to a virtual page having a copy segment in the embodiment.

In the flowchart of FIG. 30, step S1301 is the same as step S301 in the flowchart of FIG. 14. If the cache memory 144 includes data which has not been transferred (YES at S1301), the drive write program 403 determines whether a copy segment exists for the virtual page for the data with reference to the copy segment management table 308 (S1302).

If no copy segment exists (NO at S1302), the drive write program 403 proceeds to step S1303. Step S1303 is the same as step S302 in the flowchart of FIG. 14. If a copy segment exists (YES at S1302), the drive write program 403 converts the virtual address to the physical address of the copy segment (S1304).

Specifically, the drive write program 403 locates a logical address (start address) of the copy segment for to the virtual page with reference to the copy segment management table 308. The drive write program 403 converts the logical address of the copy segment to a physical address with reference to the logical-to-physical conversion table 302. The subsequent steps S1305 and S1306 are the same as the steps S303 and S304 in the flowchart of FIG. 14. At the step S1306, the storage controller 155 updates the I/O count of the copy segment and the parity group the copy segment belongs to.

Figure 31:
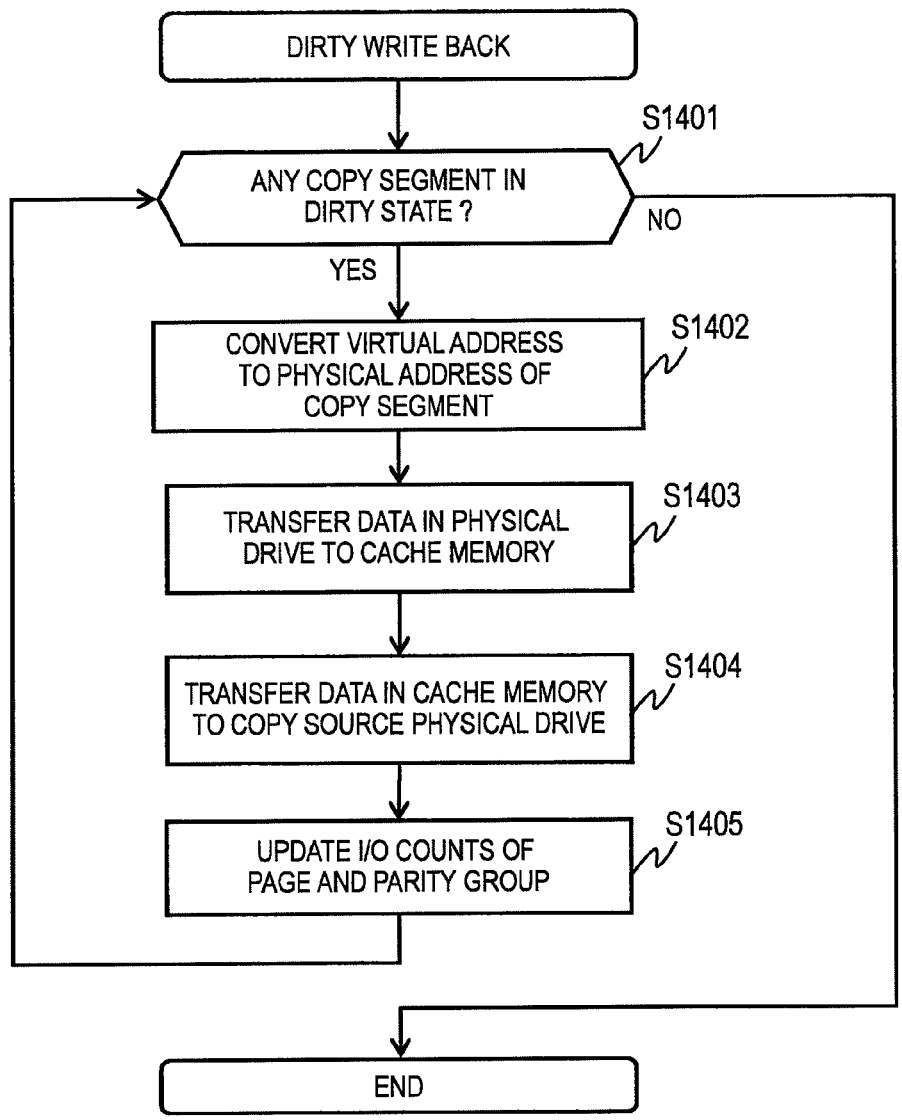
FIG. 31 is a flowchart illustrating exemplary dirty writeback of a copy segment in the embodiment.

Next, with reference to FIG. 31, exemplary dirty write-back of a copy segment will be described. This operation makes page data in a copy source identical to the data in the copy segment.

The dirty write-back program 404 determines whether a copy segment in a dirty state exists with reference to the copy segment management table 308 (S1401). If no copy segment in a dirty state exists (NO at S1401), the dirty write-back program 404 exits this flow.

If a copy segment in a dirty state exists (YES at S1401), the dirty write-back program 404 converts the virtual address of the page to the physical address of the copy segment with reference to the copy segment management table 308 and the logical-to-physical conversion table 302 (S1402).

The dirty write-back program 404 transfers data in the area of a physical storage drive indicated by the foregoing physical address to the cache memory 144 (S1403). The dirty write-back program 404 transfers the data in the cache memory 144 to a physical storage drive indicated by the physical address of the copy source page (S1404). The dirty write-back program 404 can acquire the physical address of the copy source page with reference to the virtual-to-logical conversion table 301 and the logical-to-physical conversion table 302.

After the completion of the write back of the data in the copy segment to the copy source page, the dirty write-back program 404 updates the granular monitoring table 303 and the parity group monitoring table 304.

Specifically, the dirty write-back program 404 increases the value in the I/O count column 704 of the relevant entry in the granular monitoring table 303. The dirty write-back program 404 increases the values in the I/O count column 803 of the entries of the parity groups of the copy segment and the copy source page in the parity group monitoring table 304 (S1405). This write back corresponds to a read from the copy segment and a write to the copy source page.

Figure 32:
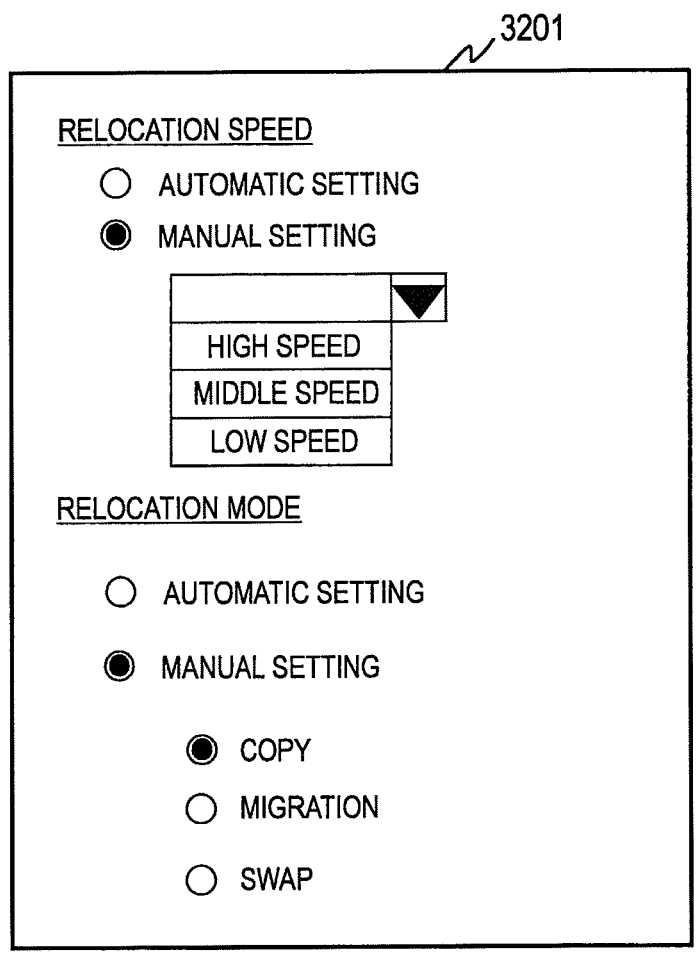
FIG. 32 illustrates an exemplary GUI for a user (administrator) to set a relocation mode in the embodiment.

FIG. 32 provides an exemplary GUI for a user (administrator) to set the relocation method. The user can select a relocation method using the input/output device 124. In this example, the user can choose to set the relocation speed and the relocation mode automatically or manually. The image 3201 of FIG. 32, manual setting has been chosen for the relocation speed and the relocation mode and the copy mode has been selected as the relocation mode. The choice of manual setting does not need to be provided for the relocation speed and the relocation mode. The choice between manual setting and automatic setting may be provided for only either the relocation speed or the relocation mode.

Hereinafter, other exemplary relocation of page data will be described. This example relocates (promotes) a page on which the I/O count (IOPS) has reached a threshold to a higher-class tier. In the example explained below, the relocation applies the copy mode.

FIG. 33 illustrates another exemplary configuration of the relocation speed management table 306. The relocation speed management table 306 includes columns of relocation speed numbers 3301, promotion thresholds 3302, the maximum number of jobs in demotion 3303, and sleep times in demotion 3304.

The column of the maximum number of jobs in demotion 3302 defines the maximum number of jobs for concurrent execution in dirty write-back. The column of sleep times in demotion 3304 defines sleep times in dirty write-back.

Figure 34:
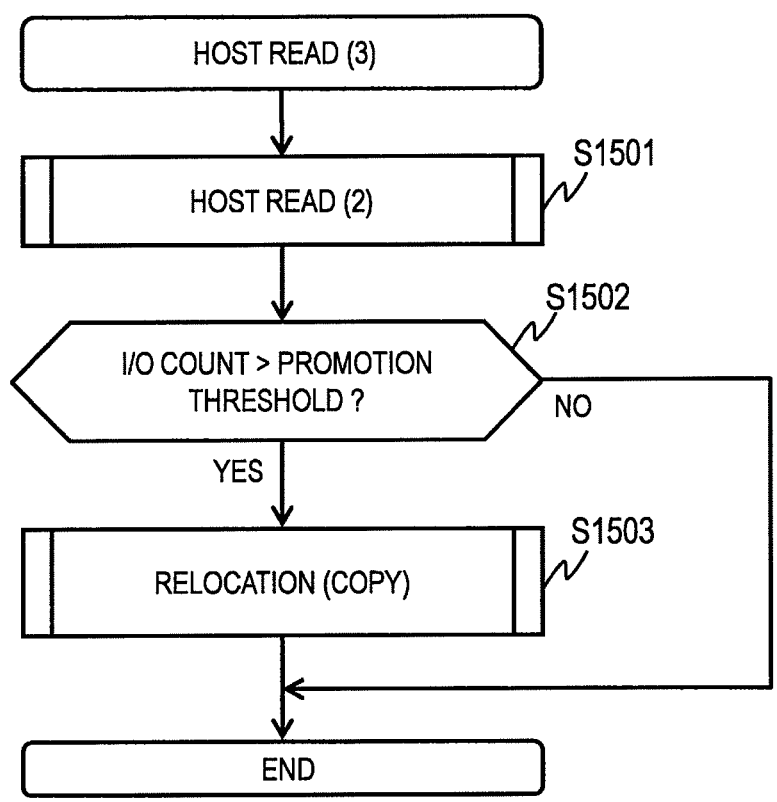
FIG. 34 is a flowchart illustrating exemplary relocation in accordance with the I/O count of a page in the embodiment.

FIG. 34 is a flowchart of read in this example. Step S1501 corresponds to the flowchart of FIG. 28. At the next step S1502, the host read program 401 determines whether the I/O count of the selected page is greater than the promotion threshold.

Specifically, the host read program 401 acquires the I/O count of the selected page from the granular monitoring table 303 and further acquires the relocation speed number for promotion from the tier the page belongs to from the relocation job execution management table 305. The host read program 401 acquires a promotion threshold for the relocation speed number from the relocation speed management table 306 and compares the value with the I/O count of the page.

If the I/O count is greater than the promotion threshold (YES at S1502), the relocation program 405 executes promotion of the data in the page (S1504). This step corresponds to the flowchart of FIG. 27. If the I/O count is equal to or smaller than the promotion threshold (NO at S1502), this flow is terminated.

As to a write, the storage controller 155 can also determine whether to promote from the relation between the promotion threshold and the I/O count. The foregoing example refers to the I/O count on a page in the last monitoring period, but the determination of promotion can be made with reference to the number of page I/Os being counted in the current monitoring period. The storage controller 155 updates the number of I/Os being counted to the initial value after promotion of the page data has been completed.

As set forth above, an embodiment of this invention has been explained, but this invention is not limited to the foregoing embodiments. Those skilled in the art can easily modify, add, or convert the elements in the foregoing embodiment within the scope of this invention.

The above-described configurations, functions, processors, and means for processing, for all or a part of them, may be implemented by hardware, for example, by designing integrated circuits. The information of programs, tables, and files to implement the functions may be stored in a storage device such as a non-volatile semiconductor memory, a hard disk drive, or a solid state drive (SSD), or a computer-readable non-transitory data storage medium such as an IC card, an SD card, or a DVD.

The above-described exemplary configuration determines both of a relocation speed and a relocation mode; however, another configuration may determine only either one of them to perform relocation in accordance with the determined speed or mode. At least a part of the processing of the storage system in the above-described configuration may be performed by the management system. In this configuration, the information storage system includes the management system and the storage system; the management system is included in the controller in the information storage system. The information storage system can include a plurality of storage systems.

The invention claimed is:

1. An information storage system comprising:
a plurality of physical storage drives different in performance for providing real storage areas to a pool which is tiered into a plurality of tiers different in performance; and
a controller,
wherein the controller monitors accesses to a first tier in the pool;
wherein the controller determines a loaded state of the first tier based on the accesses to the first tier;
wherein the controller holds management information relating loaded states of the first tier to relocation speeds and/or modes of moving data in data relocation between a second tier in the pool and the first tier; and
wherein the controller determines at least one of a relocation speed and a mode of moving data in data relocation between the second tier and the first tier based on the determined loaded state of the first tier and the management information,
wherein the controller determines degrees of improvement in access performance by relocation at different relocation speeds based on numbers of pages that can be relocated at the different relocation speeds, access performance of the first tier and access performance of the second tier, and wherein the controller selects a new relocation speed from the different relocation speeds based on the determines degrees.

2. An information storage system according to claim 1, wherein the management information relates loaded states of the first tier to relocation speeds of moving data in data relocation between the second tier and the first tier;
wherein the controller determines a relocation speed in data relocation between the second tier and the first tier; and wherein a parameter for the relocation speed is a stand-by time after data relocation until next data relocation.

3. An information storage system according to claim 2, wherein parameters for the relocation speed includes a job multiplicity in relocation between the second tier and the first tier.

4. An information storage system according to claim 1, wherein the controller monitors accesses to the second tier and determines a loaded state of the second tier based on the accesses to the second tier;
wherein the management information relates loaded states of the first tier, loaded states of the second tier, and relocation speeds; and wherein the controller determines a relocation speed in relocation between the second tier and the first tier based on the management information and the determined loaded states of the first tier and the second tier.

5. An information storage system according to claim 4, wherein the controller monitors data accesses in the pool; and wherein the controller determines a relocation speed in the relocation between the second tier and the first tier based on a number of accesses to data to be relocated between the first tier and the second tier.

6. An information storage system according to claim 1, wherein the modes of moving data include at least two of swap, migration, and copy.

7. An information storage system according to claim 1, wherein the modes of moving data include swap and migration;

wherein the first tier is a higher-class tier than the second tier;

wherein, in a case where a loaded state of the first tier is higher than a threshold, the controller selects the swap as the mode of moving data.

8. An information storage system according to claim 1, wherein the modes of moving data include copy and migration;

wherein the first tier is a lower-class tier than the second tier;

wherein, in a case where a loaded state of the first tier is higher than a threshold, the controller selects the copy as the mode of moving data, and in a case where the loaded state of the first tier is equal to or lower than the threshold, selects the migration as the mode of moving data.

9. An information storage system according to claim 6, wherein the modes of moving data include copy; and wherein the controller accesses a copy segment of data relocated by the copy in response to an access command from a host and monitors accesses to the copy segment.

10. An information storage system according to claim 9, wherein the controller makes data at a copy source address of the copy segment identical to the data in the copy segment.

11. An information storage system according to claim 1, wherein the controller manages the pool in units of pages each composed of a storage area;

wherein the controller monitors accesses to pages; and wherein, in a case where a value indicating monitored accesses to a page is higher than a predetermined threshold, the controller determines to relocate the page to a higher-class tier.

12. An information storage system comprising:

a plurality of physical storage drives different in performance for providing real storage areas to a pool which is tiered into a plurality of tiers different in performance; and a controller, wherein the controller monitors accesses to a first tier in the pool;

wherein the controller determines a loaded state of the first tier based on the accesses to the first tier;

wherein the controller holds management information relating loaded states of the first tier to relocation speeds and/or modes of moving data in data relocation between a second tier in the pool and the first tier; and wherein the controller determines at least one of a relocation speed and a mode of moving data in data relocation between the second tier and the first tier based on the determined loaded state of the first tier and the management information;

wherein the controller holds results of the monitoring accesses to the first tier and information indicating relations between access frequencies in the first tier and response performance values to a host; and wherein the controller estimates effects of degradation in response performance to the host caused by relocation at a plurality of different relocation speeds with reference to the results of the monitoring and the information indicating the relations and selects a new relocation speed from the plurality of relocation speeds based on the estimated effects.

13. A method of controlling an information storage system including a plurality of physical drives which are different in performance and provide real storage areas to a pool, the pool being tiered into a plurality of tiers different in performance, the method comprising:

monitoring accesses to a first tier in the pool;

determining a loaded state of the first tier based on the accesses to the first tier;

holding management information relating loaded states of the first tier to relocation speeds and/or modes of moving data in data relocation between a second tier in the pool and the first tier; and determining at least one of a relocation speed and a mode of moving data in data relocation between the second tier and the first tier based on the determined loaded state of the first tier and the management information, wherein the controller determines degrees of improvement in access performance by relocation at different relocation speeds based on numbers of pages that can be relocated at the different relocation speeds, access performance of the first tier and access performance of the second tier, and wherein the controller selects a new relocation speed from the different relocation speeds based on the determines degrees.

14. A method of controlling an information storage system according to claim 13, wherein the information storage system holds results of the monitoring accesses in the first tier and information indicating relations between access frequencies in the first tier and response performance values to a host; and wherein effects of degradation in response performance to a host caused by relocation at a plurality of different relocation speeds are estimated with reference to the results of the monitoring and the information indicating the relations to select a new relocation speed from the relocation speeds.

15. A method of controlling an information storage system according to claim 13, wherein the modes of moving data include copy and migration;

wherein the first tier is a lower-class tier than the second tier;

wherein, in a case where a loaded state of the first tier is higher than a threshold, the copy is selected as the mode of moving data, and in a case where a loaded state of the first tier is equal to or lower than the threshold, the migration is selected as the mode of moving data.

* * * * *